United States Patent [19]
Arima

[11] Patent Number: 5,790,760
[45] Date of Patent: Aug. 4, 1998

[54] PROGRAM GENERATING APPARATUS AND METHOD THEREOF

[75] Inventor: Jun Arima, Kawasaki, Japan

[73] Assignee: Fujitsu Limited, Kawasaki, Japan

[21] Appl. No.: 606,748

[22] Filed: Feb. 27, 1996

[30] Foreign Application Priority Data

Feb. 28, 1995 [JP] Japan .................................... 7-040394

[51] Int. Cl.$^6$ .................................................. G06F 15/18
[52] U.S. Cl. ............................. 395/10; 706/45; 395/701
[58] Field of Search .............................. 395/701, 75, 10, 395/22, 50, 13, 1

[56] References Cited

U.S. PATENT DOCUMENTS

| | | | |
|---|---|---|---|
| 4,949,253 | 8/1990 | Chigira et al. | 395/500 |
| 5,038,296 | 8/1991 | Sano | 395/51 |
| 5,084,813 | 1/1992 | Ono | 395/703 |
| 5,148,513 | 9/1992 | Koza et al. | 395/13 |
| 5,315,710 | 5/1994 | Kishimoto et al. | 395/701 |
| 5,347,614 | 9/1994 | Yamada et al. | 395/75 |
| 5,353,371 | 10/1994 | Honiden et al. | 395/10 |
| 5,381,548 | 1/1995 | Matsuo | 395/703 |
| 5,517,635 | 5/1996 | Cross et al. | 395/500 |
| 5,522,078 | 5/1996 | Matsuzuki | 395/702 |
| 5,539,862 | 7/1996 | Short et al. | 395/50 |
| 5,542,085 | 7/1996 | Kanzaki et al. | 707/6 |

OTHER PUBLICATIONS

M.L. Wong and K.S. Leung, "Inducing Logic Programs With Genetic Algorithms: The Genetic Logic Programming System," IEEE Expert, vol. 10(5), pp. 68–76, Oct. 1995.

C.X. Ling, "Logic Synthesis from Good Examples," in Inductive Logic Programming, Academic Press, pp. 113–129, Dec. 1992.

P.S. Chen, et al., "On the Retrieval of Reusable Software Components," 2nd Int'l. Workshop on Software Reuse, pp. 99–108, Mar. 1993.

(List continued on next page.)

Primary Examiner—Robert W. Downs
Attorney, Agent, or Firm—Armstrong, Westerman, Hattori, McLeland, & Naughton

[57] ABSTRACT

A pre-processing portion retrieves several alternative program names with the same number of arguments as that of given input/output examples from a reference program cache table. A denotational determining portion successively retrieves alternative programs from a reference program database, supplies received input examples to the alternative programs, and obtains outputs of the programs. Thereafter, the denotational determining portion compares each obtained output with each given output example and determines whether or not each alternative program can be used. The denotational determining portion outputs the program name of the suitable alternative program. Thus, a desired program is automatically retrieved from pre-developed programs with retrieval keys of input/output examples. Consequently, alternative programs can be easily obtained.

36 Claims, 22 Drawing Sheets

OTHER PUBLICATIONS

F. Bergadano and D. Gunetti, "Inductive Synthesis of Logic Programs and Inductive Logic Programming," Proc. Logic Program Synthesis and Transformation, pp. 45–56, Jul. 1993.

R. Olsson, "Inductive functional programming using incremental program transformation," Artificial Intelligence, vol. 74(1), pp. 55–81, Mar. 1995.

M.K. Kamani and R.S. Ramakrishna, "Predicate–Formation for Synthesizing LISP Code," IEEE Trans. Systems, Man, and Cybernetics, vol. 20(1), pp. 530–533, Mar. 1990.

P. Flener and Y. Deville, "Towards Stepwise, Schema–Guided Synthesis of Logic Programs," Proc. Logic Program Synthesis and Transformation, pp. 46–64, Jul. 1991.

Y.S. Maarek, et al., "An Information Retrieval Approach for Automatically Constructing Software Libraries," IEEE Trans. Software Engineering, vol. 17(8), pp. 800–813, Aug. 1991.

G. Fouque and S. Matwin, "CAESAR: a system for CAse basED SoftwAre Reuse," Knowledge–Based Software Engineering Conference, pp. 90–99, Sep. 1992.

A. W. Biermann, "Dealing With Search," in Automatic Program Construction Techniques, Macmillan Publishing Co., pp. 375–392, Dec. 1984.

J.L. McClelland and D.E. Rumelhart, Explorations in Parallel Distributed Processing, MIT Press, pp. 137–145, Dec. 1988.

A. Nakase, et al., "An Inductive Inference Algorithm to Synthesize Prolog Programs from Specification by Example," J. Information Processing, vol. 12(1), pp. 34–41, Dec. 1988.

R. Freivalds, et al., "Inductive Inference from Good Examples," Int'l Workshop on Analogical and Inductive Inference, pp. 1–17, Dec. 1989.

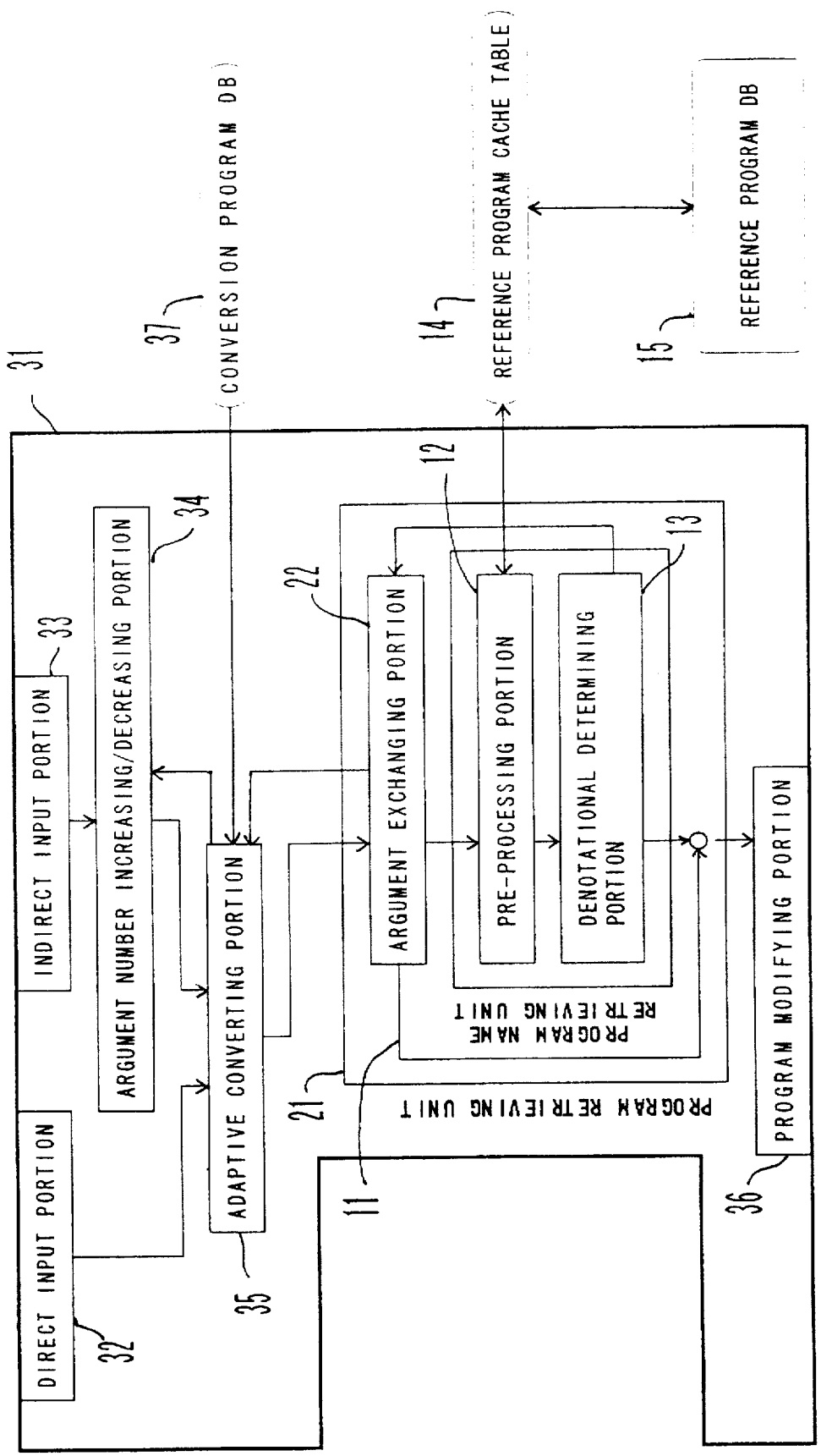
F I G. 5

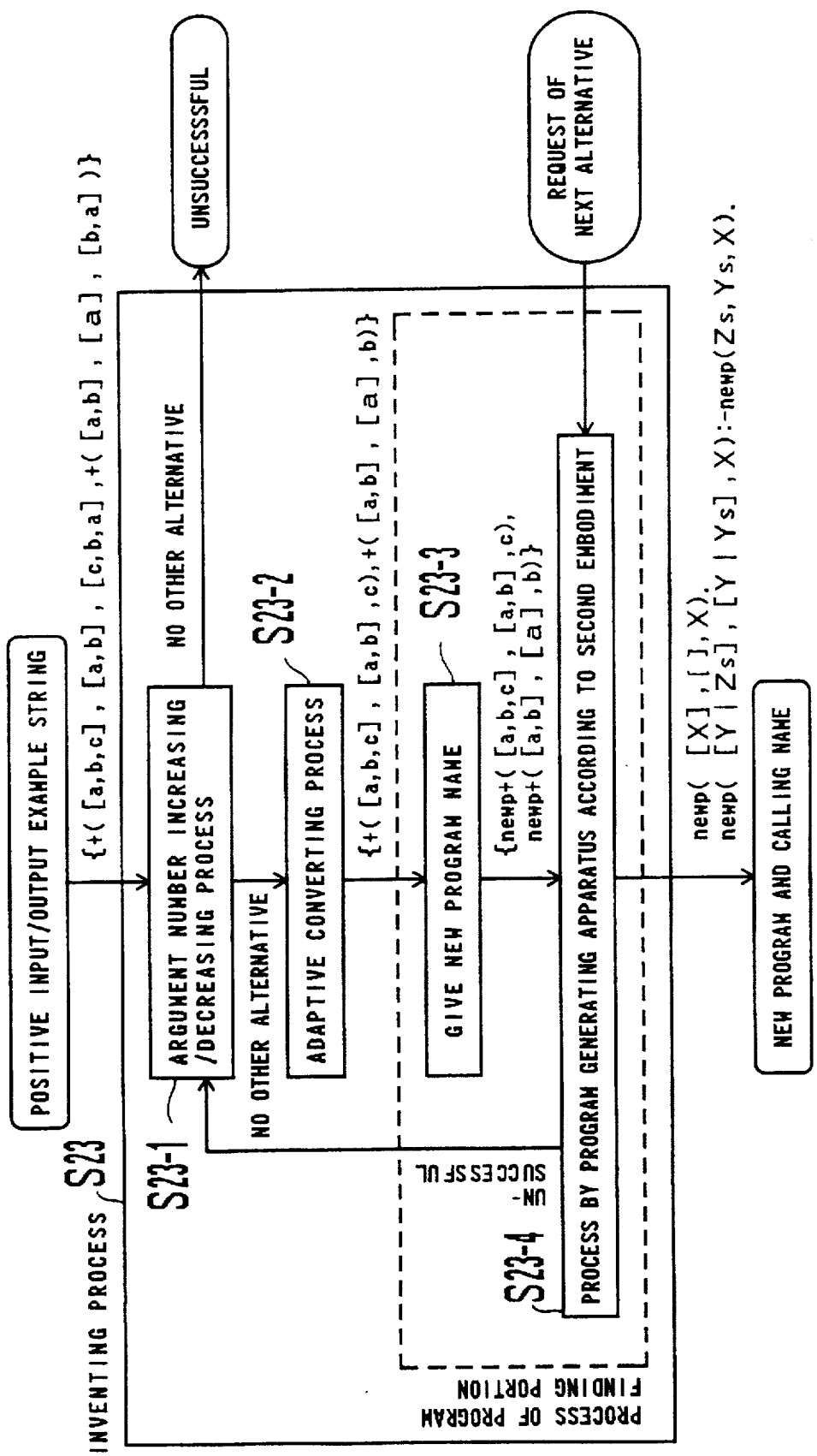
F I G. 1 7

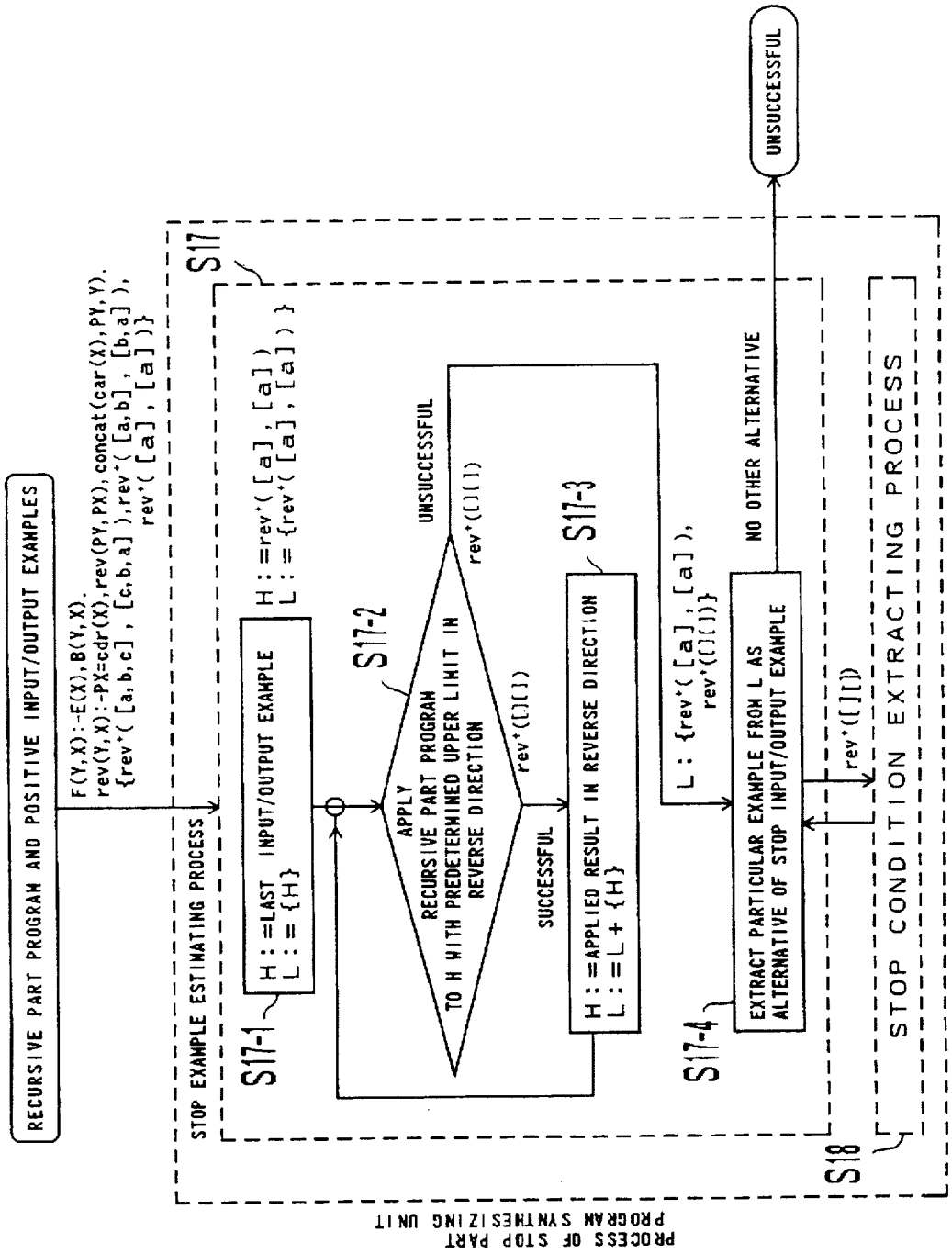
F I G. 18

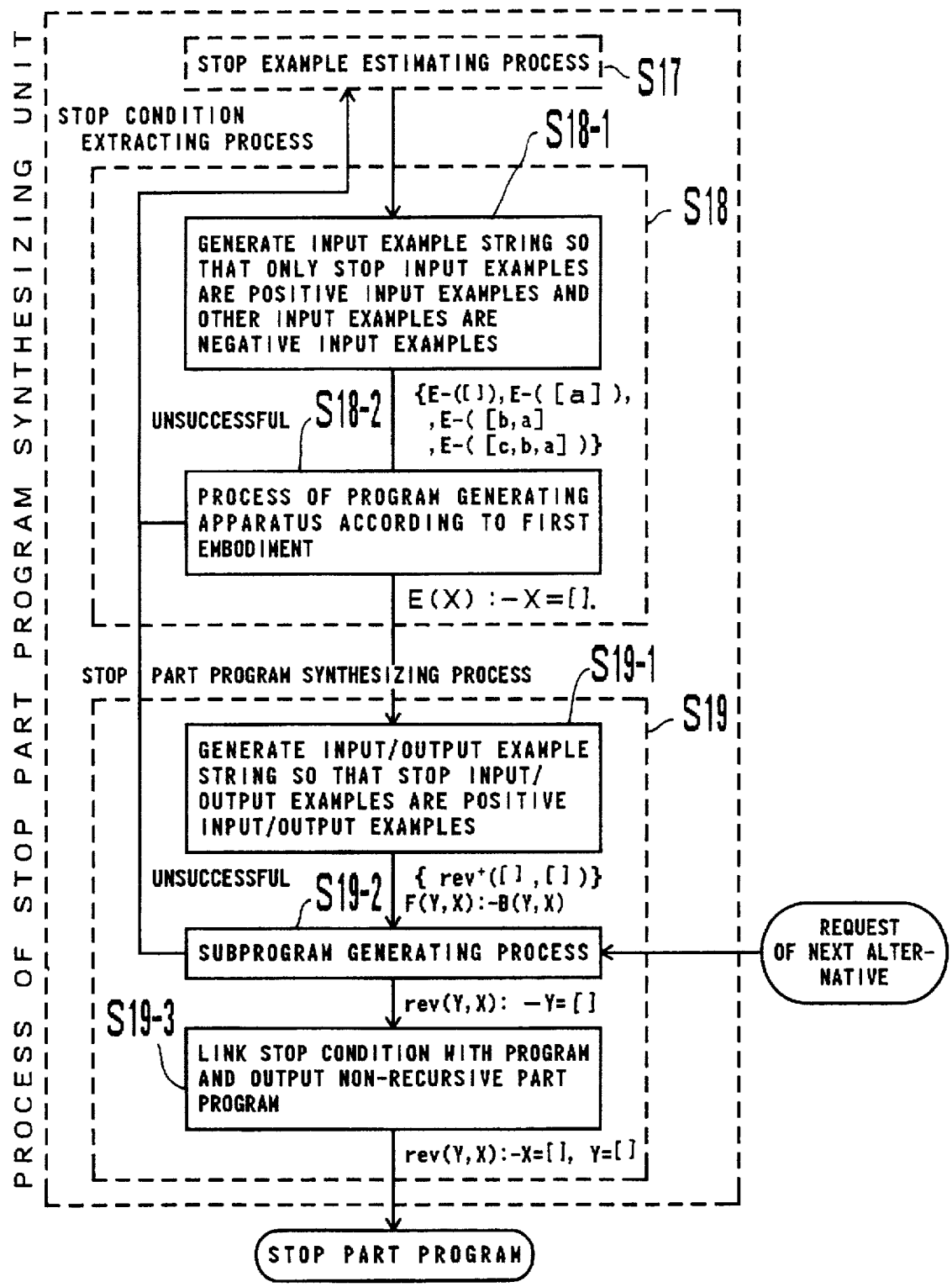
F I G. 19

PROGRAM GENERATING APPARATUS AND METHOD THEREOF

BACKGROUND OF THE INVENTION

1. Field of the Invention

The present invention relates to an automatic programming apparatus, in particular, to a program generating apparatus for retrieving a desired program from a database that stores programs that have been developed, and automatically generating the desired program and a method thereof.

2. Description of the Related Art

In the current software developing environment in which various types of software applications have been developed, if programs that have been developed are effectively used, new programs can often be easily created with use of developed programs. Since the number of programs that have been developed is huge, it is difficult for the user to read program codes and specifications thereof. Thus, it is necessary to automatically select a desired program from the huge collection of programs that have been developed so far. Hereinafter, the programs that have been developed and created so far are referred to as pre-developed programs.

As conventional program retrieving methods, using key words of names of programs, comments therein, specifications thereof, and so forth, or with natural language processes, a desired program is retrieved. In addition, with visual information such as icons, still pictures, moving pictures, and so forth, pre-developed programs are visually displayed so that the user can select a desired program from the displayed programs.

In addition, there are two major program synthesizing methods for automatically generating a desired program. In the first method, a program is extracted from the process for proving a theorem corresponding to formal specification of the program. In the second method, a desired program is functionally generated from input/output examples of programs. The formal specifications of programs are specifications of programs corresponding to, for example, input/output examples, predicate logic, and so forth. The input/output examples of programs are sets of real input values and output values of programs.

However, the above-described conventional program retrieving methods have the following problems.

In the methods using natural language and visual information, one program may be represented in other ways. Thus, it is difficult to correctly retrieve a desired program from the collection of pre-developed programs.

In addition, to effectively employ the keyword retrieving method, the language and syntax should be regulated. Thus, such a method is not practical. On the other hand, in the visual information retrieving method, along with such a problem, the amount of information that can be displayed at one time is limited. Thus, in this method, the retrieval range of information is very narrow. These methods are not effective from the view of general users.

In addition, there is no way to assure that the retrieved program is the desired program.

Moreover, a desired program should be manually retrieved. Even if a desired program is automatically retrieved, a keyword that is a natural language should be manually input. Thus, even if a desired program can be generated as subprograms (auxiliary programs) of a plurality of pre-developed programs, these subprograms cannot be automatically retrieved.

Although a supporting method for correcting a retrieved program in the specification level is possible, it should be corrected manually, not automatically.

In the conventional program synthesizing method, there are the following problems.

In the conventional method using the formal specification, the complete formal specification of the desired program is required. However, the description of the complete formal specification of a desired program is as difficult as the creation of a new program.

On the other hand, the method using input/output examples has the following problems.

To synthesize a program, a large number of input/output examples are required. Even if a basic program is generated, a very large number of input/output examples should be provided. For example, to generate a program for reversing a list, a large number of input/output examples (for example, input/output examples in the order of several tens to several hundreds) are often required.

In addition, the number of types of data handled by a program that is automatically generated is substantially restricted to very small value. In most cases, such a data type is restricted to only list. In a real program that deals with both numeric data and term data, this restriction is a critical problem.

Moreover, the class of a generated program is very narrow. Conventionally, a program is composed of a plurality of subprograms. However, pre-developed programs cannot be directly used as subprograms in most cases. Thus, when the pre-developed programs cannot be used as subprograms, the desired program cannot be synthesized.

In another related art reference, when there are no pre-developed programs that can be directly used, subprograms are newly generated. However, in this case, a lot of information about the subprograms should be provided as a precondition. For example, the user should input the number of arguments of each subprogram and information about the input/output examples of the subprogram. However, unlike with information about a desired program, it is very difficult to input the information about the subprograms.

In the conventional algorithm, it is assumed that there are a minimum number of programs to generate a desired program. Thus, this algorithm is not suitable in the case that there are many unnecessary programs. In the case that the conventional algorithm is used in the environment where there are many programs, when a subprogram is retrieved, the amount of calculation increases tremendously. This situation is called a combinational explosion. Thus, the calculation time increases significantly. When subprograms necessary for synthesizing a desired program are properly provided or when they are low in number, the result is obtained. Thus, there is no way to use many pre-developed programs.

Furthermore, since various heuristic techniques are used in pre-developed programs from which a desired program is retrieved, the range of the pre-developed programs is not clear. The heuristics are techniques for retrieving optimum solutions using, for example, evaluation functions. In addition, it is not easy to widen the class of the pre-developed programs.

SUMMARY OF THE INVENTION

An object of the present invention is to provide a program generating apparatus for allowing a software resource created by many unknown programmers to be effectively used, and a method thereof.

According to the present invention, a program generation supporting operation is performed by a computer corresponding to an imperfect specification that the user can easily input. Thus, software resources that have been created by many unknown programmers can be effectively used. In addition, since the pre-developed software resources are increasingly being used, the workload of the user who develops a new program can be reduced.

According to the present invention, a pre-processing unit is adapted for receiving a given argument example and supplying information of an alternative program of the desired program.

A determining unit is adapted for applying a first part of the argument example to the alternative program corresponding to the information of the alternative program received from the pre-processing unit, comparing the output with a second part of the argument example, determining whether or not the alternative program can be used, and outputting the information of the alternative program when the alternative program can be used.

A program information storing unit is adapted for storing information of a plurality of programs. The pre-processing unit is adapted for retrieving the information of the alternative program from the program information storing unit.

The argument example is a string in which a string of real examples of arguments that are input to a desired program and real examples of the output thereof are linked. The determining unit is adapted for determining if the alternative program can be used when the argument example is a correct input/output example of the desired program and the output accords with the second part of the argument example. In addition, the determining unit is adapted for determining if the alternative program can be used when the argument example is an incorrect input/output example of the desired program and the output does not accord with the second part of the argument example.

The pre-processing unit accords with the pre-processing portion. The determining unit accords with the denotational determining portion. The program information storing unit accords with either or both the reference program cache table and the reference program database.

The pre-processing unit interprets given argument examples as input/output examples of a desired program and selects alternatives of the desired program corresponding to the argument examples. Information of alternative programs is obtained from the program information storing unit. The information of the alternative programs accords with the alternative programs or program names thereof. Thus, the pre-developed programs can be used.

The determining unit is adapted for applying a first part of the argument example of the desired program to the alternative program corresponding to the information of the alternative program received from the pre-processing unit, obtaining an output of the alternative program, comparing the output with the second part of the argument example of the desired program, determining whether or not the alternative program can be used, and outputting the information of the alternative program when the alternative program can be used.

Thus, when argument examples (input/output examples) of a desired program are given, pre-developed programs corresponding to the desired program are automatically retrieved. Thus, the programs or their program names are output. Since the argument examples to be given are real examples of the arguments of the programs to be used, they can be easily used by the computer. In addition, the argument examples can be easily input by the user. Thus, the user can effectively use the pre-developed programs without too much workload.

BRIEF DESCRIPTION OF DRAWINGS

These and other objects, features and advantages of the present invention will become more apparent in light of the following detailed description of best mode embodiments thereof, as illustrated in the accompanying drawings.

FIG. 5 is a detailed block diagram showing the construction of the program generating apparatus according to the first embodiment of the present invention;

FIG. 17 is a detailed operating flow chart showing an inventing process according to the second embodiment of the present invention;

FIG. 18 is a detailed operating flow chart (No. 1) of the stop part program synthesizing unit according to the second embodiment of the present invention;

FIG. 19 is a detailed operating flow chart (No. 2) of the stop part program synthesizing unit according to the second embodiment of the present invention;

DESCRIPTION OF PREFERRED EMBODIMENTS

Next, with reference to the accompanying drawings, embodiments of the present invention will be described.

Figure 1:
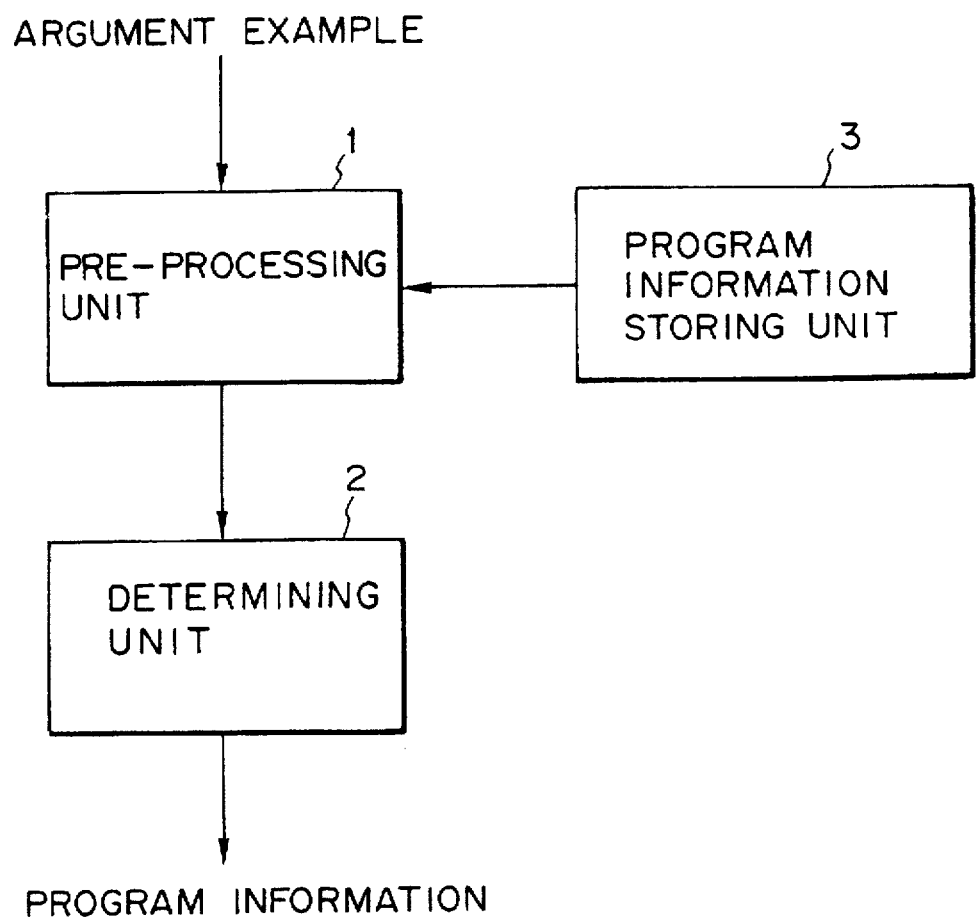
FIG. 1 is a block diagram showing the theoretical construction of a program generating apparatus according to the present invention.

FIG. 1 is a block diagram showing the theoretical construction of a program generating apparatus according to the present invention. The program generating apparatus shown in FIG. 1 comprises a pre-processing unit 1, a determining unit 2, and a program information storing unit 3.

The pre-processing unit 1 receives given argument examples and outputs information of alternatives of the desired program.

The determining unit 2 applies a first portion of the argument example to the alternative program corresponding to the information of the alternative program received from the pre-processing unit 1, compares the output with a second portion of the argument example, determines whether or not the alternative program can be used, and outputs the information of the alternative program when the alternative program can be used.

The program information storing unit 3 stores information of a plurality of programs. The pre-processing unit 1 retrieves the information of the alternative program from the information storing unit 3 and outputs the information.

The argument example represents a string in which a string of real argument examples that are input to the desired program is linked to a string of real argument examples that are output from the desired program. In the case that the argument example represents a correct input/output example of the desired program, when the output of the alternative program accords with the second portion of the argument example, the determining unit 2 determines that the alternative program can be used. In the case that the argument example represents an incorrect input/output example of the desired program, when the output does not accord with the second portion of the argument example, the determining unit 2 determines that the alternative program can be used.

Figure 2:
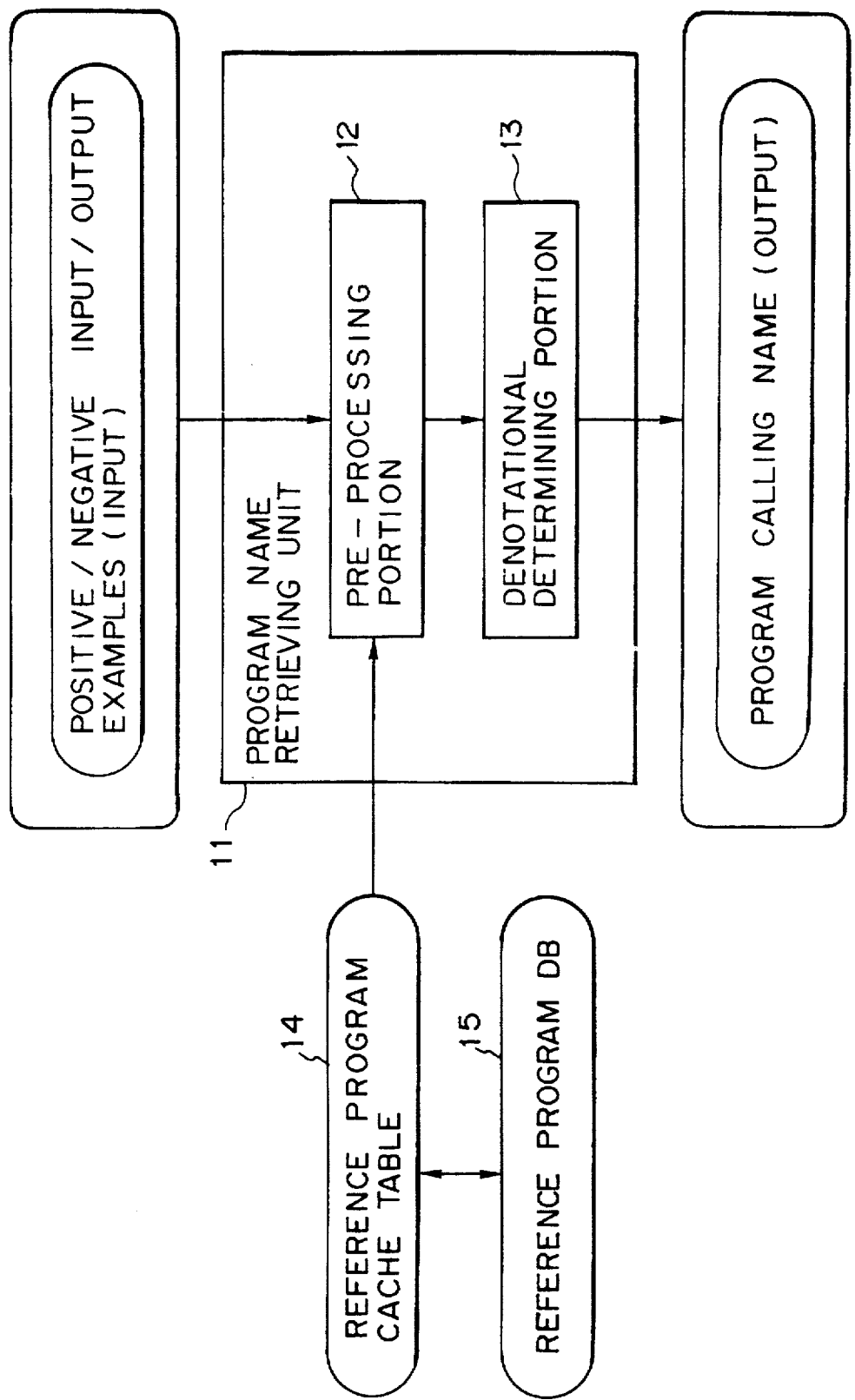
FIG. 2 is a block diagram showing the construction of a program name retrieving unit according to a first embodiment of the present invention.

The pre-processing unit 1 shown in FIG. 1 accords with a pre-processing portion 12 shown in FIG. 2. The determining unit 2 shown in FIG. 1 accords with an denotational determining portion 13 shown in FIG. 2. The program information storing unit 3 shown in FIG. 1 accords with either or both a reference program cache table 14 and a reference program database 15 shown in FIG. 2.

The pre-processing unit 1 interprets the given argument examples as input/output examples of the desired program and obtains rough requirements for an alternative of the desired program corresponding to the argument examples and, according to the requirements, extracts the information of the alternative program from the program information storing unit 3. The information of the alternative program accords with the alternative program or the program name.

The determining unit 2 extracts the alternative program corresponding to the information of the alternative program, applies the first portion of the argument example corresponding to the input argument of the desired program to the alternative program, and obtains the output of the alternative program. Thereafter, the determining unit 2 compares the output of the alternative program with the second portion of the argument example corresponding to the output arguments of the desired program and determines whether or not the alternative program can be used. When the alternative program can be used, the determining unit 2 outputs the information of the alternative program.

Thus, when argument examples (input/output examples) of a desired program are given, a pre-developed program that corresponds thereto is retrieved. Thus, the retrieved program or the program name thereof is output. Since the given argument examples are real argument examples of the program to be used, they can be easily processed by the computer and input by the user. Thus, the user can effectively use the pre-developed programs with only a small workload.

The program generating apparatuses according to the first embodiment and the second embodiment of the present invention can be accomplished as information processing apparatuses having a memory and a processing unit.

FIG. 2 is a block diagram showing the construction of a program name retrieving unit according to the first embodiment of the present invention. The program name retrieving unit 11 shown in FIG. 2 comprises a pre-processing portion 12 and a denotational determining portion 13. The program name retrieving unit 11 retrieves a program with an unknown program name using keys of input/output examples of the program.

A program to be retrieved and input/output examples that are keys of the program may have a plurality of outputs against one input. In addition, either inputs or outputs may be omitted. Moreover, outputs may not be distinguished from inputs. Furthermore, an input/output example may include a variable along with a fixed value.

The pre-processing portion 12 roughly selects programs as the first stage from a reference program database (reference program DB) 15 or a reference program cache table 14 corresponding to the given input/output example. Thereafter, the pre-processing portion 12 collects calling names of the selected programs and so forth and outputs them as a set of alternative program names (a set of alternative names).

The reference program database 15 is a database of a set of pre-developed programs. Related programs are retrieved from the reference program database 15. On the other hand, the reference program cache table 14 is a storing unit that stores partial information of the pre-developed programs stored in the reference program database 15. The partial information includes values of arguments, program names, and if necessary, locations of programs, special reserved words, information of arguments of programs, and particular program codes.

When the reference program cache table 14 is used, the number of times of the retrieving operations for the reference program database 15 is reduced and thereby the retrieving speed is improved. For example, information of programs that have been retrieved from the reference program database 15 is stored in the reference program cache table 14. Thus, when the same programs are retrieved, the program names and so forth can be quickly obtained by accessing the reference program cache table 14.

Major problems of the related art references about the retrieving operation arise because retrieval keys are information that is not suitable for computers. To solve such problems, in the program name retrieving unit 11 shown in FIG. 2, real input/output examples of a program are used as retrieval keys. Input/output examples are categorized as positive input/output examples and negative input/output examples. A positive input/output example represents a pair of input given to a related program and a correct output corresponding thereto. A negative input/output example represents a pair of input given to a related program and an incorrect output corresponding thereto.

Positive/negative input/output examples (positive input/output examples or negative input/output examples) are a set of inputs and outputs that can be processed or understood by any computer or any user. The positive/negative input/output examples are formal specifications because they clearly represent characteristics of a program to be satisfied. However, since the positive/negative input/output examples do not give all input/output examples, they are not perfect specifications. Thus, since a set of real inputs/outputs is used, these examples can be more easily understood than abstractively represented specifications. In addition, the positive/negative input/output examples are more easily used by the user than the method corresponding to fully represented formal specifications.

The denotational determining portion 13 separates input/output examples into input value examples (input examples) and output value examples (output examples) and applies each input example to programs included in the set of alternative names so as to obtain real outputs. Thereafter, the denotational determining portion 13 compares the obtained outputs with the given output examples and finds a program that satisfies all the input/output examples from the set of alternative names. The determined result of the denotational determining portion 13 is output as a calling name of a program (a program name), a program code, or the like.

When a particular input/output example is a positive input/output example, if a particular input/output (A) of a program accords with an input/output example (B), the input of (A) is equal to the input of (B) and the output of (A) is equal to the output of (B). On the other hand, when an input/output example is a negative input/output example, if the input/output (A) of a program accords with the input/output example (B), the input of (A) is equal to the input of (B) and the output of (A) is not equal to the output of (B).

Moreover, when a particular input (output) is equal to another input (output), the former accords with the latter in a predetermined condition.

Figure 3:
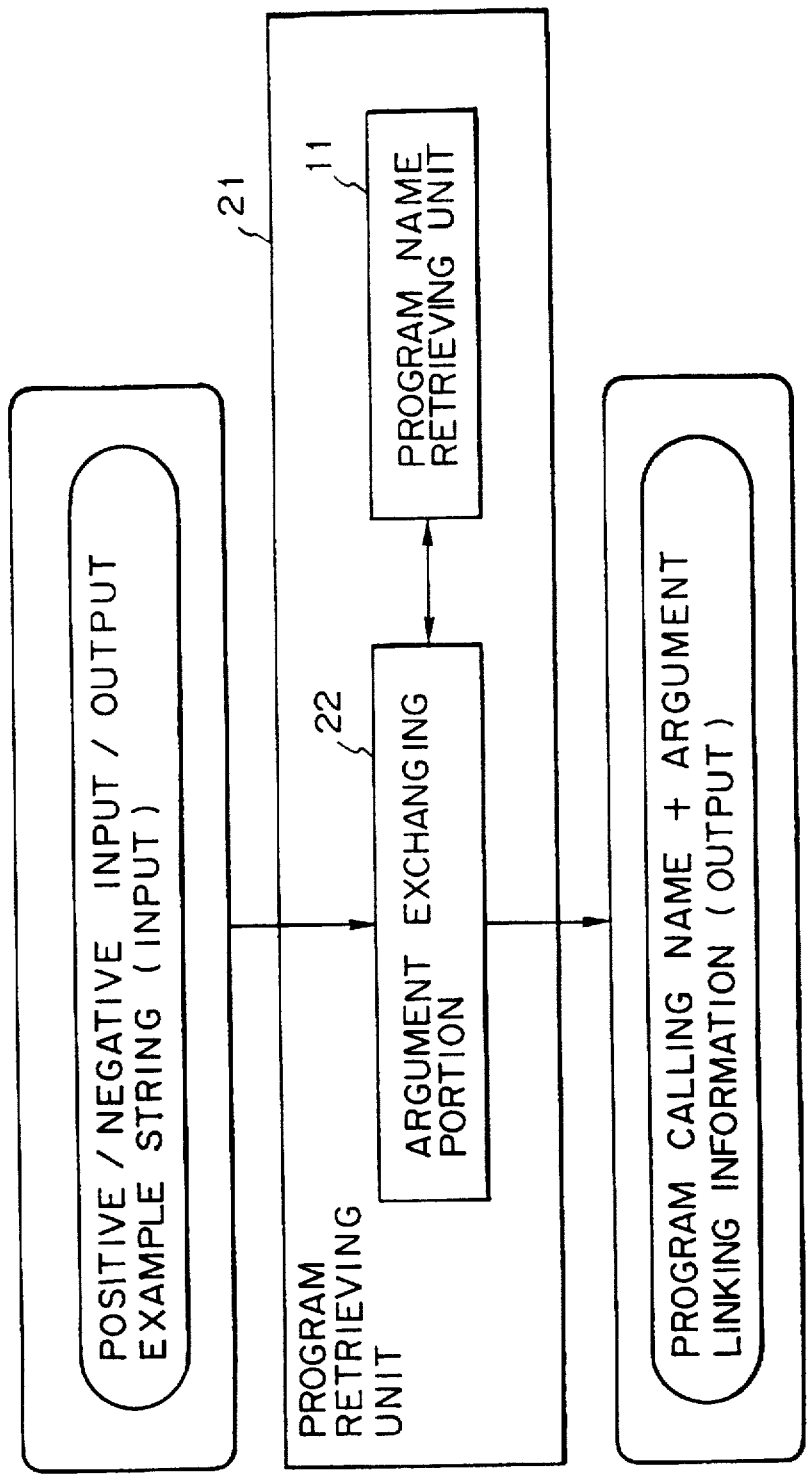
FIG. 3 is a block diagram showing the construction of a program retrieving unit according to the first embodiment of the present invention.

FIG. 3 is a block diagram showing the construction of the program retrieving unit according to the first embodiment of the present invention. In FIG. 3, a program retrieving unit 21 comprises a program name retrieving unit 11 shown in FIG. 2 and an argument exchanging portion 22. Thus, the program retrieving unit 21 retrieves a program of which the program name and the order of arguments are unknown.

The argument exchanging portion 22 receives a plurality of positive/negative input/output examples, changes the positions of the arguments in the positive/negative input/output examples, and supplies the resultant positive/negative input/output examples to the program name retrieving unit 11. The given positive/ negative input/output examples are referred to as a positive/negative input/output string. The program name retrieving unit 11 retrieves a program with keys of the given positive input/output examples or negative input/output examples and supplies the retrieved result, such as program names, to the argument exchanging portion 22. The argument exchanging portion 22 outputs the received program names and so forth along with the linkage information of the positions of the arguments.

With the argument exchanging portion 22, a program can be retrieved regardless of the positions of the arguments of the given positive/negative input/output examples. Thus, even if the program name and the order of the arguments are unknown, a program that accords with the positive/negative input/output examples can be retrieved.

Figure 4:
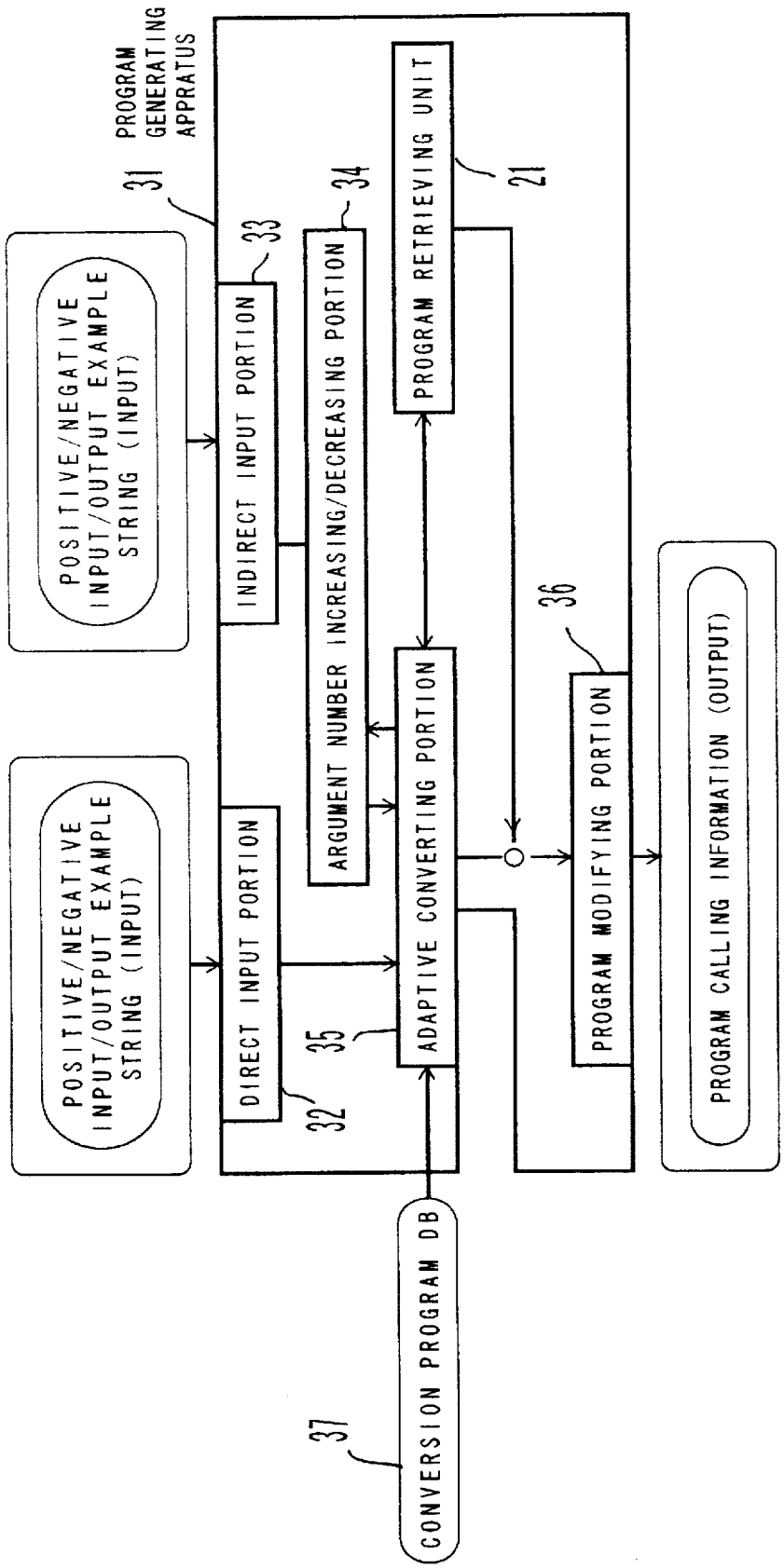
FIG. 4 is a block diagram showing the construction of the program generating apparatus according to the first embodiment of the present invention.

FIG. 4 is a block diagram showing the construction of a program generating apparatus according to the first embodiment of the present invention. The program generating apparatus 31 shown in FIG. 4 comprises a program retrieving unit 21 shown in FIG. 3, a direct input portion 32, an indirect input portion 33, an argument number increasing/decreasing portion 34, an adaptive converting portion 35, and a program modifying portion 36. Even if the number of arguments of the program, and the usage of the program are unknown along with the program name and the order of arguments, the program generating apparatus 31 retrieves or generates a program, slightly modifies it, and outputs it to the user.

Only argument parts of the given positive/negative input/output examples of which the number of arguments is not increased or decreased are supplied as positive/negative input/output part examples to the direct input portion 32. When a plurality of positive/negative input/output part examples are given, they are treated as a positive/negative input/output part example string. The direct input portion 32 supplies the given positive/negative input/output part examples to the adaptive converting portion 35. The indirect input portion 33 receives the remaining argument parts of which the number of arguments can be increased or decreased as positive/negative input/output part examples. At this point, when a plurality of positive/negative input/output part examples are given, they are treated as a positive/negative input/output part example string. The indirect input portion 33 supplies the given positive/negative input/output part examples to the argument number increasing/decreasing portion 34.

If necessary, the argument number increasing/decreasing portion 34 increases or decreases the number of arguments included in each of the input/output part examples received from the indirect input portion 33 within a predetermined range, and supplies the resultant input/output part examples to the adaptive converting portion 35. When the number of arguments is increased, proper values or variables are designated so as to generate a new input/output part example. On the other hand, when the number of arguments is decreased, the value of a particular argument is removed so as to generate a new input/output part example. In addition, the argument number increasing/decreasing portion 34 generates a conversion function that converts an original input/output part example to a new input/output part example, and supplies the conversion function to the adaptive converting portion 35 along with the new input/output part example.

The adaptive converting portion 35 links the input/output part examples received from the argument number increasing/decreasing portion 34 with the remaining input/output part examples received from the direct input portion 32, converts the values of the arguments corresponding to the conversion programs stored in the conversion program database (conversion program DB) 37, and outputs the result as one perfect input/output example. The conversion program database 37 stores various functions for converting values of arguments as conversion programs.

In addition, the adaptive converting portion 35 outputs a conversion function for inputting a perfect input/output example of which input/output part examples received from the direct input portion 32 and input/output part examples received from the indirect input portion 33 have been linked, and for outputting the converted input/output example. The conversion function is obtained by synthesizing the conversion function generated by the argument number increasing/decreasing portion 34 and the function obtained from the conversion program database 37.

The program retrieving unit 21 receives a new input/output example from the adaptive converting portion 35 and outputs a program name and linkage information of arguments that satisfy the new input/output example.

The program modifying portion 36 receives the conversion function from the adaptive converting portion 35 and the program name and linkage information of the arguments from the program retrieving unit 21, synthesizes them to be program calling information, and outputs the synthesized result.

According to the program generating apparatus 31 of the first embodiment, the number of arguments is increased or decreased and the value of each argument is simply converted. Thus, the pre-developed programs can be effectively reused. This feature is very important to retrieve a subprogram of a particular program from a program database. In this case, an output against a plurality of inputs of a program (subprogram) to be retrieved is generally unknown. Thus, the number of input arguments should be reduced so as to retrieve a desired program (subprogram).

In the case that a pre-developed program to be used has an unnecessary argument, when a proper variable is designated to the program, it may be used. In addition, when an input/output example is simply converted, a pre-developed program may be used in many cases.

Now, assume that a positive/negative input/output example string of which a first argument is an output and other arguments are inputs as with {+([a, b, c], [a, b], [c, b, a], [b, a]), −([b, a, c], [a, b], [c, b, a], [b, a]), +([a, b], [a], [b, a], [a])} is given. In this case, "+( )" represents one positive input/output example, whereas "−( )" represents one negative input/output example. In {argument 1, . . . . }, each argument included in each positive/negative input/output is represented in a list format [. . . . . . . . . . . . . . . ].

In addition, assume a general subprogram retrieval situation in which an output can be calculated based on some of inputs. For example, a first argument of arguments of each input/output example of the input/output example string is supplied to the direct input portion 32. The rest of the arguments (namely, the second argument to the fourth argument) are supplied to the indirect input portion 33. The argument number increasing/decreasing portion 34 removes the fourth argument from the input/output part example received from the indirect input portion 33. The adaptive converting portion 35 applies a function "car" for extracting the first element of the list to the third argument and a function that does not vary the list to other arguments.

Thus, a new positive/negative input/output example string {+([a, b, c], [a, b], c), −([b, a, c], [a, b], c), +([a, b], [a], b)} is supplied to the program retrieving unit 21. The program retrieving unit 21 retrieves the desired program from the reference program database 15 or the reference program cache table 14 with a key of the positive/negative input/output example string. Thereafter, the program retrieving unit 21 outputs a pre-developed program "concat" which places the first element at the end of the list.

In reality, in the first positive input/output example "+([a, b, c], [a, b], c)", when the third argument "c" is added to the last of the list "[a, b]" of the second argument, an output argument "[a, b, c]" is obtained. Thus, the result is equal to the first argument that is an output. For the last positive input/output example "+([a, b], [a], b)", the result accords with the output similarly. For the second negative input/output example "−([b, a, c], [a, b], c)", when the third argument "c" is added to the end of the second argument "[a, b]", a list "[a, b, c]" is obtained. However, the list [a, b, c] does not accord with the output argument "[b, a, c]". Thus, the program "concat" that is output accords with all the positive/negative input/output examples. Thus, the user can use the pre-developed program "concat".

When the conversion program database 37 is provided, a basic function for outputting a value corresponding to a particular input can be stored. In addition, the user can easily define synthetic functions and store them in the conversion program database 37 if necessary. Thus, the user can extend and modify the adaptive conversion performance of the system. However, when many conversion functions are used, since the load of the program retrieving unit 21 is significantly increased, the number of conversion programs to be stored in the conversion program database 37 should be restricted. Consequently, since the user can store only effective functions, the number of times of the retrieving operation and thereby the process time can be effectively reduced.

FIG. 5 is a detailed block diagram showing the construction of the program generating apparatus 31 according to the first embodiment of the present invention. In FIG. 5, for simplicity, similar portions to those shown in FIGS. 2, 3, and 4 are denoted by similar reference numerals. In FIG. 5, a conversion program database 37, a reference program cache table 14, and a reference program database 15 are disposed outside a program generating apparatus 31. However, it should be noted that part or all of these portions can be disposed inside the program generating apparatus 31.

Figure 6:
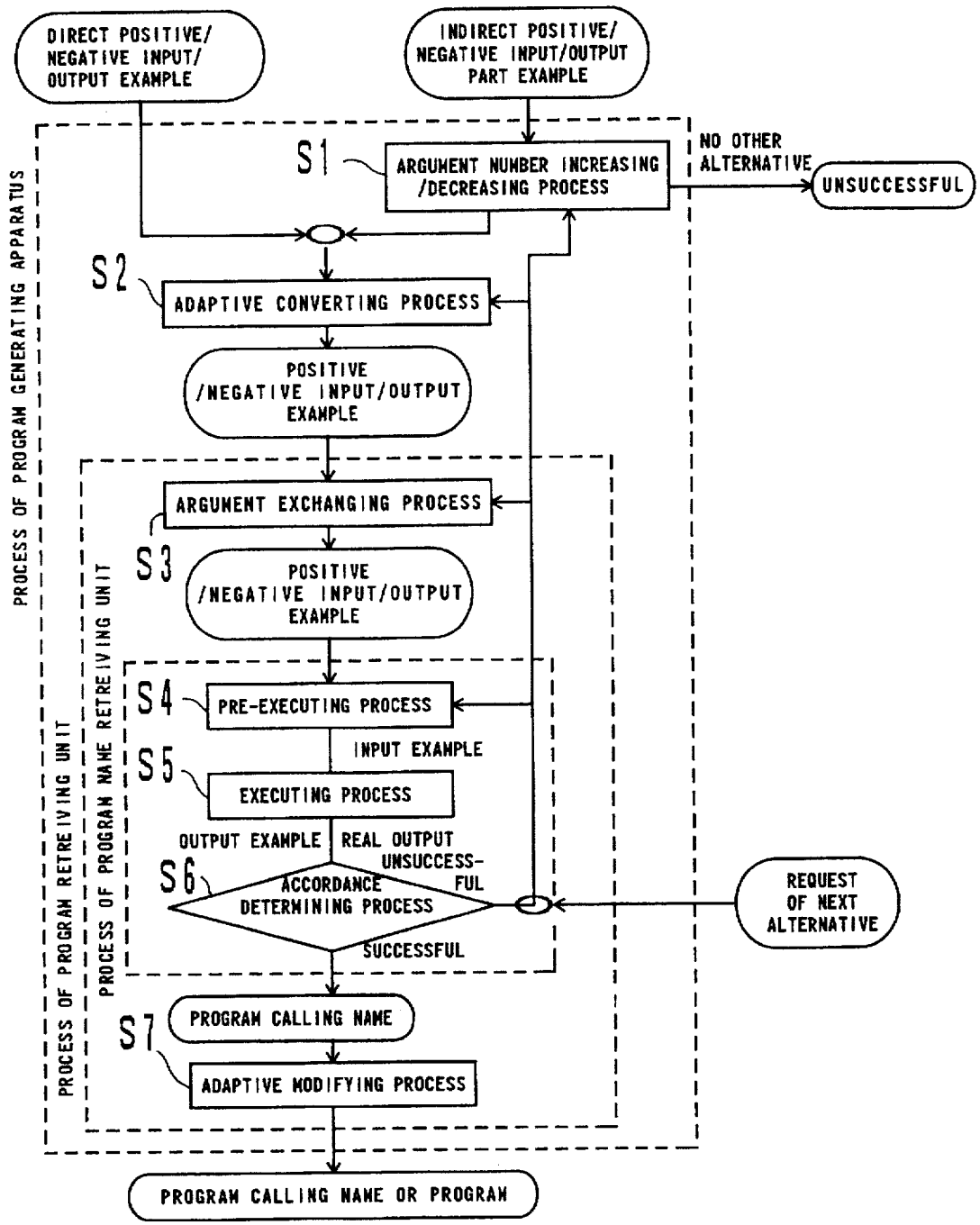
FIG. 6 is an operating flow chart showing the program generating process according to the first embodiment of the present invention.

FIG. 6 is an operating flow chart showing a program generating process performed by the program generating apparatus according to the first embodiment of the preset invention. When a positive/negative input/output example is input as a direct positive/negative input/output part example of which the number of arguments is not increased or decreased and an indirect positive/negative input/output part example of which the number of arguments is increased or decreased, the following processes shown in FIG. 6 are started. Next, the processes shown in FIG. 6 will be described.

(Step S1) Argument number increasing/decreasing process

The argument number increasing/decreasing portion 34 receives an indirect input/output part example from the indirect input portion 33 and removes an argument part from the input/output part example so as to generate a decreased part example with a length ranging from 0 to M (where M is the number of arguments included in the received input/output part example). In addition, the argument number increasing/decreasing portion 34 generates a conversion function (decrease conversion function) for converting the original input/output part example to the decreased part example.

Thereafter, the argument number increasing/decreasing portion 34 adds new arguments (the number of new arguments is less than or equal to a predetermined upper limit) to the decreased part example, and generates an increasing/decreasing part example by substituting suitable values thereto or designating variables thereto. In addition, the argument number increasing/decreasing portion 34 generates a conversion function for converting the decreased part example to the increased/decreased part example, synthesizes the conversion function with the decrease conversion function, generates a conversion function (increased/decreased conversion function) for converting the original input/output part example into an increased/decreased part example, combines the increased/decreased conversion function and the increased/decreased part example, and outputs the result to the adaptive converting portion 35.

(Step S2) Adaptive converting process

The adaptive converting portion 35 links the direct input/output part example received from the direct input portion 32 and the increased/decreased part example received from the argument number increasing/decreasing portion 34 and generates a perfect input/output example. Thereafter, the adaptive converting portion 35 retrieves a proper conversion function from the conversion program database 37 and applies the retrieved conversion function to the linked input/output example. Thus, an adaptive input/output example that has been converted is obtained. In addition, the adaptive converting portion 35 synthesizes the increase/decrease conversion function with the applied function, generates a conversion function (adaptive conversion function) to the adaptive input/output example corresponding to the given input/output example, and outputs the generated conversion function to the program retrieving unit 21 along with the adaptive input/output example. The given input/output example is equivalent to the result in which the direct input/output part supplied to the direct input portion 32 and the indirect input/output part example supplied to the indirect input portion 33 are linked.

(Step S3) Argument exchanging process

The argument exchanging portion 22 designates a function for properly changing the order of arguments of a new positive/negative input/output example (adaptive input/output example) received from the adaptive converting portion 35. Thereafter, the argument exchanging portion 22 changes the order of the arguments of the adaptive input/output example corresponding to the function and generates an exchanged input/output example. Next, the argument exchanging portion 22 synthesizes the generated function with the adaptive conversion function, generates a conversion function (exchange conversion function) for converting the given input/output example into the exchanged input/output example, and outputs the conversion function along with the exchanged input/output example.

(Step S4) Pre-executing process

The pre-processing portion 12 obtains the number of arguments of a program to be retrieved corresponding to the positive/negative input/output example (exchanged input/output example) received from the argument exchanging portion 22. Thereafter, the pre-processing portion 12 retrieves a program name with corresponding arguments as an alternative name from the reference program cache table 14. If the corresponding arguments have not been stored in the reference program cache table 14, the pre-processing portion 12 retrieves all program names with the corresponding arguments from the reference program database 15. The pre-processing portion 12 stores the number of arguments and program names to the reference program cache table 14 and designates the program names as alternative names.

For example, when an input/output example with three arguments is received, the pre-processing portion 12 retrieves all program names of programs with three arguments from the reference program database 15 and stores the program names along with data "<3:{append, concat, ... }>" to the reference program cache table 14. In this case, "3" represents the number of arguments, and "append", "concat", and so forth represent the calling names of programs with three arguments. In this case, when the pre-processing portion 12 designates alternative names of programs with three arguments, it does not need to search the entire region of the reference program database 15.

The pre-processing portion 12 supplies the received input/output example and obtained alternative names to the denotational determining portion 13.

(Step S5) Executing process

The denotational determining portion 13 separates a received input/output example into an input example part and an output example part. The denotational determining portion 13 determines that a positive input/output example that does not have output arguments has an output with a true value. On the other hand, the denotational determining portion 13 determines that a negative input/output example that does not have output arguments has an output with false value. In addition, the denotational determining portion 13 applies an input example to programs with the received alternative names, executes the programs, and obtains at least one executed output (real output) corresponding to the input example. However, when the input/output example does not have an output argument, the denotational determining portion 13 outputs true/false value as the executed output.

(Step S6) Accordance determining process

Next, the denotational determining portion 13 compares each of the executed outputs with the output example separated from the input/output example. In the case that the received input/output example is a positive input/output example, when it accords with one of the executed outputs, the denotational determining portion 13 determines that the process is successful and outputs the calling name of the program. On the other hand, in the case that the received input/output example is a negative input/output example, when it does not accord with any executed output, the denotational determining portion 13 also determines that the process is successful and outputs the calling name of the program. Otherwise, the denotational determining portion 13 determines that the process is unsuccessful.

In this embodiment, when an executed output Eout is identical to an output example Gout, the denotational determining portion 13 determines that Eout accords with Gout.

If the process is unsuccessful, the program generating apparatus 31 continuously performs the pre-executing process, the argument exchanging process, the adaptive converting process, and the argument number increasing/decreasing process so as to obtain the next alternative. For example, when there is another program name of a program with the same number of arguments as that of the input/output example, the program generating apparatus 31 returns to the pre-executing process, which designates the program name of the next alternative. When the program generating apparatus 31 cannot obtain a new alternative through these processes, it determines that the process is unsuccessful and terminates the process.

(Step S7) Adaptive modifying process

When the denotational determining portion 13 determines that the process is successful, the program modifying portion 36 generates and outputs a program name or a program that is synthesized from the exchange conversion function received from the argument exchanging portion 22 and the program name received from the denotational determining portion 13. Thus, the program modifying portion 36 partly modifies the retrieved program corresponding to the exchange conversion function as with "output program name" (Z):="retrieved program name" (exchange conversion function (Z)) (where Z is an argument).

After the program name or the program is output at step S7, if the user requests the next alternative program, the program generating apparatus 31 performs the pre-executing process, the argument exchanging process, the adaptive converting process, and the argument number increasing/decreasing process in order and outputs the next alternative.

In the pre-executing process at step S4, if a received input/output example includes a variable, it may be matched with the value of the real executed output by the accordance determining process at step S6 so as to embody the variable.

Alternatively, in the executing process at step S5, the retrieved program is executed and the result is output. However, when all the positive/negative input/output results that are within predetermined ranges are prepared for each program, output values can be obtained without the need to execute the retrieved program. As another alternative method, basic programs may be provided that simulate programs in a predetermined range and thereby obtain the output results. If the execution of a program results in an incorrect result, the program can be simulated without the need to execute it. To simulate the program, the virtual execution environment of the program is structured by software and simulated under an execution environment.

When the program is executed, a processing unit (not shown) may be disposed outside the program generating apparatus 31 so that an input example can be supplied to the processing unit and the program executed.

In the first embodiment shown in FIG. 5, the direct input portion 32, which receives a direct input/output part example, and the indirect input portion 33, which receives an indirect input/output part example, are separately disposed. The argument number increasing/decreasing process is not performed for the direct input/output part example. Instead of the two input portions, a control input portion that receives the entire input/output example and selects a part example for the argument number increasing/decreasing process and the adaptive converting process may be disposed. Thus, these processes can be more precisely controlled (for example, corresponding to each argument).

Figure 7:
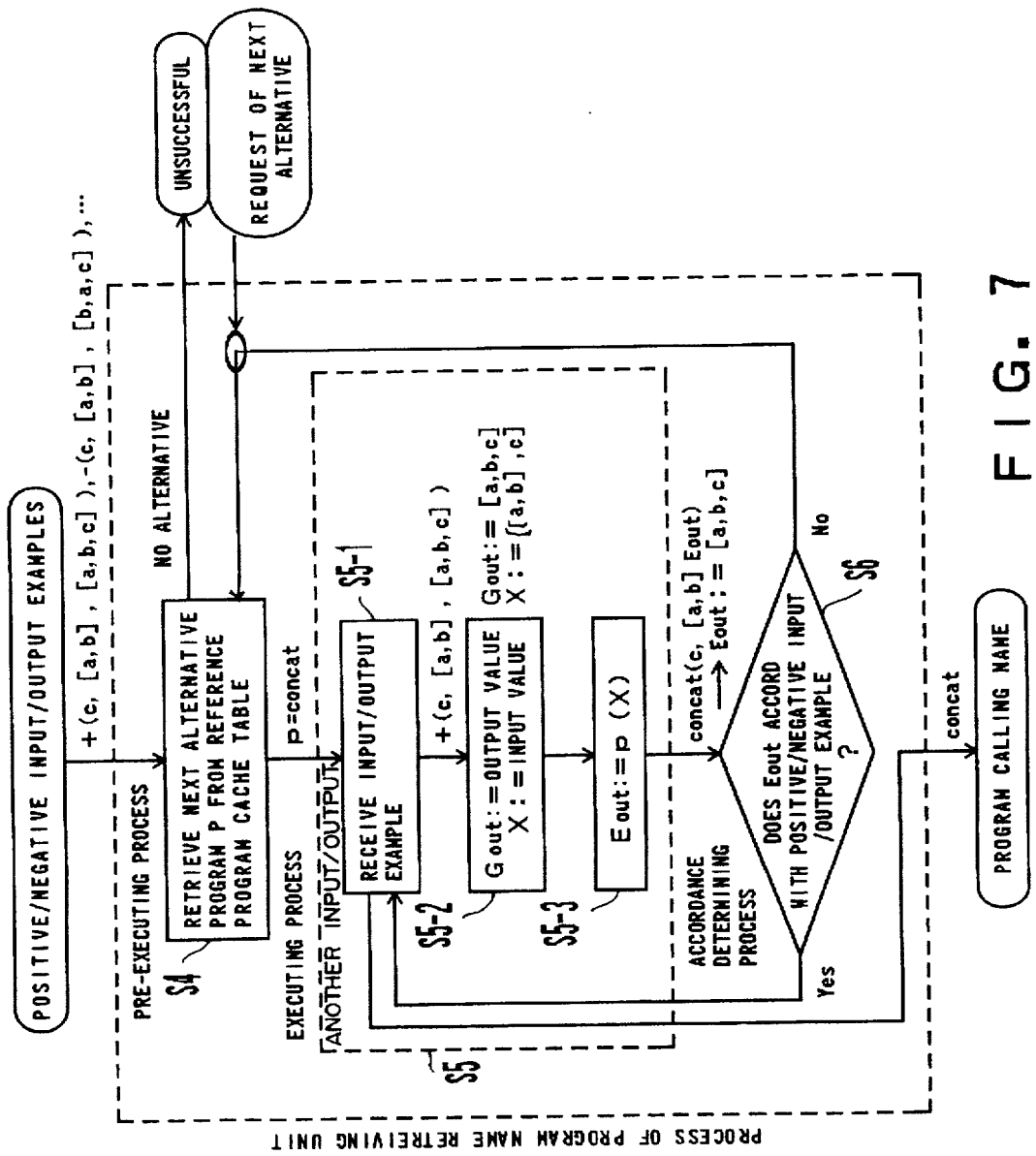
FIG. 7 is a detailed operating flow chart showing a program name retrieving process according to the first embodiment of the present invention.

FIG. 7 is a detailed flow chart showing a program name retrieving process performed by the program name retrieving unit 11. In FIG. 7, the program name retrieving process is performed for real input/output examples. The steps shown in FIG. 7 accord with steps S4 to S6 shown in FIG. 6.

In FIG. 7, assume that a positive/negative input/output example string such as "{+(c, [a, b], [a, b, c]), –(c, [a, b], [b, a, c]), . . . }" is supplied to the pre-processing portion 12. Thus, the pre-processing portion 12 retrieves an alternative program p with three arguments from the reference program cache table 14 (at step S4). In this case, the pre-processing portion 12 retrieves a program "concat" as the alternative program p.

Thereafter, the denotational determining portion 13 extracts the first input/output example "+(c, [a, b], [a, b, c])" from the positive/negative input/output example string (at step S5-1) and separates it into an input example "X:=[[a, b], c]" and an output example "Gout:=[a, b, c]" (at step S5-2). In the case of the program "concat", the first input argument is a list and the second input argument is an atom. Thus, in the input example X, "[a, b]" is the first input argument and "c" is the second input argument.

Thereafter, the input example X is applied to the alternative program p and then an executed output "Eout:=p(X)" is obtained (at step S5-3). In this case, the program "concat" is executed for "X:=[[a, b], c]". Thus, the second input argument "c" is added to the end of the first input argument "[a, b]" and thereby an executed output "Eout:=[a, b, c]" is obtained.

Thereafter, the obtained "Eout" and the output example "Gout" are compared (at step S6). In the case of a positive input/output example, when "Eout" accords with "Gout", "Eout" accords with the positive input/output example. On the other hand, in the case of a negative input/output example, when "Eout" does not accord with "Gout", "Eout" accords with the negative input/output example.

When "Eout" does not accord with the input/output example, the pre-processing portion 12 obtains the next alternative program (at step S4) and repeats the processes at step S5-1 and later. When there is no remaining alternative program, the program name retrieving process is unsuccessfully terminated.

On the other hand, when "Eout" accords with the input/output example, the next input/output example is extracted from the positive/negative input/output example string at step S5-1 and then the processes at steps S5-2 and later are repeated. When there is no other input/output example, the calling name of the alternative program is output and the process is successfully completed.

After the calling name of the program is output, if the user requests the next alternative program, the pre-executing process at step S4 and the later processes are repeated and thereby the next alternative is output.

Figure 8:
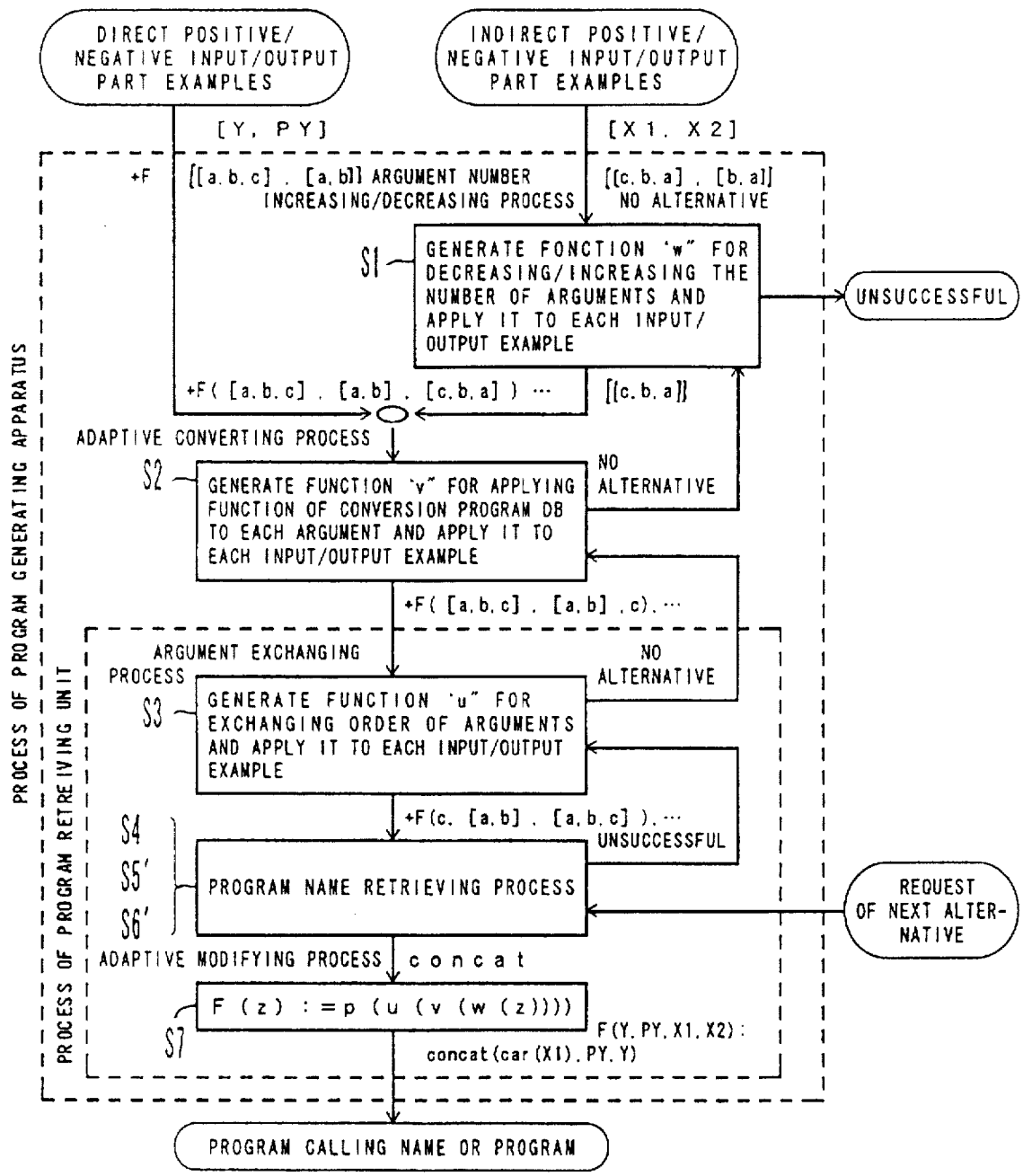
FIG. 8 is a detailed operating flow chart showing the program generating process according to the first embodiment of the present invention.

FIG. 8 is a detailed flow chart showing a program generating process. In FIG. 8, assume that arguments of a desired program "F" are "Y", "PY", "X1", and "X2" and an input/output example of the program "F" is represented by "F (Y, PY, X1, X2)". In addition, assume that a positive/negative input/output example string "F (Y, PY, X1, X2)= {+F ([a, b, c], [a, b], [c, b, a], [b, a]), –F ([b, a, c], [a, b], [c, b, a], [b, a], . . . }" is supplied to the program generating apparatus 31. Argument strings in parentheses of "+F ( )" and "–F ( )" represent positive input/output examples and negative input/output examples, respectively.

"[Y, PY]" of arguments "(Y, PY, X1, X2)" of the received input/output examples are supplied as direct input/output part examples to the direct input portion 32. "[X1, X2]" are supplied as indirect input/output part examples to the indirect input portion 33. In the case of a positive input/output example "+F ([a, b, c], [a, b], [c, b, a], [b, a])", "+F [[a, b, c], [a, b]]" are direct input/output part examples, and "[[c, b, a], [b, a]]", are indirect input/output part examples.

Thereafter, the argument number increasing/decreasing portion 34 generates a function "w" for decreasing or increasing the number of arguments and applies the function "w" to the indirect input/output part examples (at step S1). In this case, the argument number increasing/decreasing portion 34 generates a function for removing the second argument of the indirect input/output part examples as the function "w", applies the function "w" to "[[c, b, a], [b, a]]", and obtains increased/decreased part examples "[[c, b, a]]".

Thereafter, the adaptive converting portion 35 links the direct input/output part example and the input/output part examples generated by the argument number increasing/decreasing portion 34. In this case, the adaptive converting portion 35 links "+F [[a, b, c], [a, b]]" and "[[c, b, a]]" and obtains an input/output example "+F ([a, b, c], [a, b], [c, b, a])".

Thereafter, the adaptive converting portion 35 generates a function "v" for applying a conversion function stored in the conversion program database 37 to each argument and applies the function "v" to the obtained input/output example (at step S2). In this case, the adaptive converting portion 35 generates a function for removing the first element of the list of the third argument and treating the resultant third argument as a new third argument without changing the first and second arguments as the function "v". The function "car" for removing the first element from the list, has been stored in the conversion program database 37. When the function "v" is applied to the input/output example "+F ([a, b, c], [a, b], [c, b, a])", an adaptive input/output example "+F ([a, b, c], [a, b], c)" is obtained.

Thereafter, the argument exchanging portion 22 generates a function "u" for exchanging the order of the arguments of the input/output example and applies the function "u" to the adaptive input/output example (at step S3). In this case, the argument exchanging portion 22 generates a function for exchanging the order of the first argument and the third argument as the function "u". When the function "u" is applied to the adaptive input/output example "+F ([a, b, c], [a, b], c)", an exchanged input/output example "+F (c, [a, b], [a, b, c])" is obtained. Likewise, an exchanged input/output example "−F (c, [a, b], [b, a, c])" is obtained from the received negative input/output example "−F ([b, a, c], [a, b], [c, b, a], [b, a])".

The resultant exchanged input/output examples are supplied to the program name retrieving unit 11. The program name retrieving unit 11 performs the program name retrieving process (at steps S4, S5, and S6) shown in FIG. 7.

When there is no alternative program corresponding to the exchanged input/output example and the program name retrieving process is unsuccessfully terminated, the flow returns to step S3. At step S3, another function is generated as the function "u". The new function is applied to the adaptive input/output example and thereby another exchanged input/output example is generated. With a key of the exchanged input/output example, the program name retrieving process is performed.

When the program name retrieving process is repeated, if the process is unsuccessfully terminated and the next alternative program cannot be obtained, the flow returns to step S2. At step S2, another function is generated as the function "v". With the new function, another adaptive input/output example is generated. Thereafter, the processes at step S3 and later are performed.

If the repeated program name retrieving process is unsuccessfully terminated and the next alternative program cannot be obtained, the flow returns to step S1. At step S1, another function is generated as the function "w". The new function is applied to the indirect input/output part examples and thereby other increased/decreased part examples are generated. Thereafter, the processes at step S2 and later are performed.

If the program name retrieving process is not successfully completed and the next alternative program cannot be obtained, the program generating process is unsuccessfully terminated.

In the above processes, when the program name retrieving process is successfully completed, the program name retrieving unit 11 supplies the retrieved program name to the program modifying portion 36. In this case, the program name retrieving unit 11 supplies the program name "concat" to the program modifying portion 36.

Thereafter, the program modifying portion 36 synthesizes the function "w" generated by the argument number increasing/decreasing portion 34, the function "v" generated by the adaptive converting portion 35, the function "u" generated by the argument exchanging portion 22, and the program "p" retrieved from the reference program cache table 14 or the reference program database 15, and outputs the result as the desired program "F" (at step S7). Assuming that arguments are "Z=Y, PY, X1, X2", the desired program "F(Z)" is represented by "p (u (v (w (Z))))". In this case, as "F (Y, PY, X1, X2)", "concat (car (X1), PY, Y)" is obtained.

The program generating apparatus 31 outputs the program synthesized by the program modifying portion 36 and completes the process.

After the program name or the program is output at step S7, when the user requests the next alternative program, the argument exchanging process, the adaptive converting process, and the argument number increasing/decreasing process are performed in order and thereby the next alternative is output.

Figure 9:
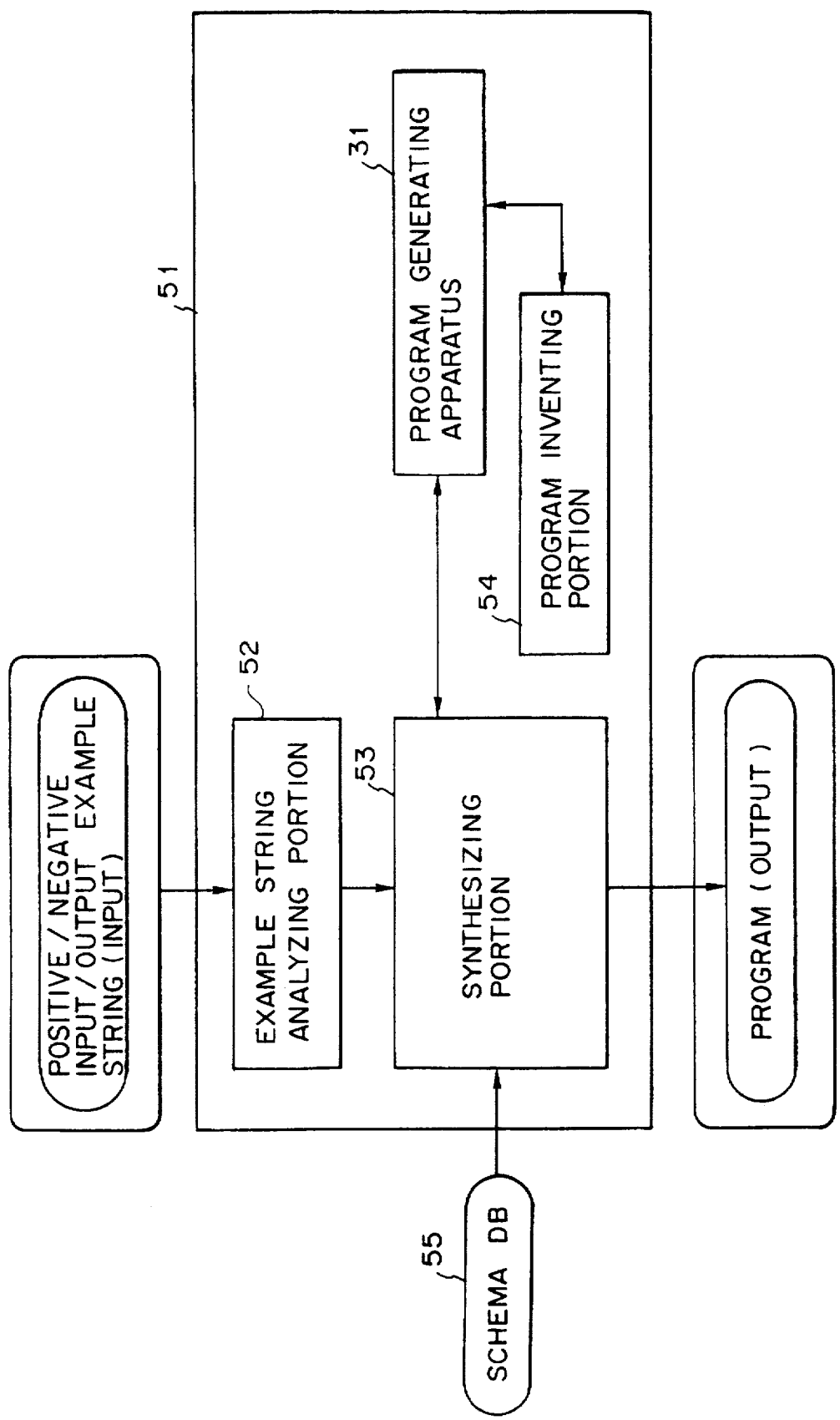
FIG. 9 is a block diagram showing the construction of a program generating apparatus according to the second embodiment of the present invention.

Next, a second embodiment of the present invention will be described. FIG. 9 is a block diagram showing the construction of a program generating apparatus according to the second embodiment of the present invention. The program generating apparatus 51 shown in FIG. 9 comprises an example string analyzing portion 52, a synthesizing portion 53, an inventing portion 54, and a program generating apparatus 31 according to the first embodiment. The program generating apparatus 51 receives a positive/negative input/output example string and generates a program that satisfies all the examples.

The example string analyzing portion 52 receives a positive/negative input/output example string and generates a new input/output example string suitable for the processes of the synthesizing portion 53, the inventing portion 54, and the program generating apparatus 31.

The synthesizing portion 53 selects an alternative of a recursive schema of a program from a schema database (schema DB) 55, and determines the part linkage structure of the program corresponding to the obtained information. The part linkage structure of a program is the structure of linkage among several subprograms (auxiliary programs) included in a desired program and data thereof. The schema represents the structure of a program. The schema database 55 is a storing unit that stores a list of a plurality of schemas.

The synthesizing portion 53 obtains positive input/output examples of each subprogram from the positive input/output example string supplied from the example string analyzing portion 52 to the synthesizing portion 53. The synthesizing portion 53 supplies the positive input/output examples to the program generating apparatus 31 so as to obtain each subprogram and generates a desired program corresponding to these subprograms.

The program inventing portion 54 is connected to the program generating apparatus 31 and generates a new program corresponding to the received input/output examples. At this point, the program generating apparatus 31 generates new program name, synthesizes the program name with the received arguments, supplies the result to the program generating apparatus 51, and outputs the obtained new program.

To automatically synthesize a program, requires a huge amount of computations. Many theoretical results show that a complete program cannot be logically synthesized in a practical range. In the second embodiment of the present invention, the program generating apparatus 31 according to the first embodiment is used for retrieving subprograms. According to the second embodiment, since the automatic retrieving operation and the automatic modifying operation are performed, the pre-developed programs can be effectively used. Consequently, a practical program synthesizing technology for solving most of the conventional problems can be provided.

The major features of the second embodiment are the use of a recursive schema and the use of an input/output example string, that is not a set of input/output examples, as a retrieval key. The recursive schema represents the type of a recursive definition corresponding to a value that has been defined. Moreover, in the second embodiment, an input/output example string of which a particular input/output example is followed by another input/output example that directly corresponds thereto is used.

Recursive schemas that have been stored in the schema database 55 are, for example, as follows.

```
Schema [1]
f (X) = if e (X) then b (X)
        else a (X, f (c (X)))
Schema [2]
f (X) = if e (X) then b (X)
        else a (f (c1 (X)), f (c2 (X)))
Schema [3]
f (X) = if e (X) then b (X)
        else f (a (X, f (c, (X))))
Schema [4]
f (X) = if e (X) then b (X)
        elseif i (X) then a (X, f (c (X)))
        otherwise UNDEFINED
```

In the above-described four schemas [1], [2], [3], and [4], "e" and "i" are predicates. In these schemas, "f", "b", "a", "c", "c1", and "c2" are functions. "X" represents a variable with a finite length. Each schema defines the type of a program as a function f (X).

For example, the schema [4] is represented as follows in Prolog, which is one of logical program languages.

```
Schema [4']
F ([Y | Xs]) : -E (Xs), B ([Y | Xs]).  (stop
                                        section)
F ([Y | Xs]) : -I (Xs),
               C (PXs, Xs),
               F ([PY | PXs])
               A ([Y, PY | Xs])         (recursive
                                        section)
where C (PXs, Xs)
      = true if |PXs| = 0,
      = C1 ([PX1 | Xs]), ... , Cn ([PXn | Xs])
        if PXs = PX1, ... , PXn
```

"F" represents the predicate name of a desired program. "E", "B", "I", "C", and "A" represent the predicate names of subprograms. In addition, the predicates "e" and "i" and the functions "f", "b", "a", and "c" of the schema [4] accord with uppercase predicates "E", "I", "F", "B", "A", and "C" in Prolog representation, respectively. Terms in parentheses are variable strings having a finite length. In this case, the relation of "Xs=X1, ... , Xn" is satisfied. In this case, the output variable of the recursive function "f" of the schema [4] closely accords with "Y" or "PY", and the input variable string closely accords with "Xs" or "PXs". "[Y|Xs]" is a variable string of which the first part is "Y" and the rest is "Xs".

However, the schema [4'] in Prolog represents a predicate that represents true or false without the need to use Xs and PXs against an input. For example, it is not necessary that the value of Y is not unique to an input Xs. From the above-described two points, the schema [4'] represents a more general program type. Most programs can be represented by this type.

Thus, according to the present invention, a word "input/output" includes the case that an input and an output are riot distinguished, as with a Prolog program. In addition, the "input/output" includes a non-functional case (namely, the case that there are a plurality of outputs against one input).

Moreover, the schema database 55 can store any type of schemas, along with recursive schemas such as the schemas [1], [2], [3], [4], and [4']. Next, the schema [4'] will be exemplified.

For example, as an input/output example string for obtaining a program "rev" for reversing a list, "{rev+ ([a, b, c], [c, b, a]), rev+ ([a, b], [b, a]), rev+ ([a], [a]), rev+ ([], [ ])}" is supplied (where "rev+ ( )" represents that an argument string in parentheses thereof is a positive input/output example of the function "rev").

When a program is retrieved only from the first input/output example "rev+ ([a, b, c], [c, b, a])" without schema, for example, the following expression is obtained.

$$\text{rev } (X, Y) :- \text{sort } (Y, X) \quad (1)$$

where "sort (X, Y)" is a built-in predicate. When the first argument is arranged in the alphabetical order of codes, the second argument is obtained.

When an input/output example string composed of two or more input/output examples is used, "F", "Y", "PY", "Xs", and "PXs" of the second section (recursive section) of the schema [4'] can be specialized by matching F([Y|Xs]) with the first example and F([PY|PXs]) with the second example for each two successive examples. For example, from the first two input/output examples "{rev+ ([a, b, c], [c, b, a]), rev+ ([a, b], [b, a])}", the following expression can be obtained.

```
rev ([a, b, c], [c, b, a]) :- I ([c, b, a]),
                             C ([b, a], [c, b, a]),
                             rev ([a, b]; [b, a]),
                             A ([a, b, c], [a, b], [c, b, a]).
                                                              ... (2)
```

In addition, from the following two input/output examples "{rev+ ([a, b], [b, a]), rev+ ([a], [a])}", the following expression can be obtained.

```
rev ([a, b], [b, a]) :- I ([b, a]),
                       C ([a], [b, a]),
                       rev ([a], [a]),
                       A ([a, b], [a], [b, a]). ... (3)
```

Moreover, from the two input/output examples "{rev+ ([a], [a]), rev+ ([ ], [ ])}", the following expression can be obtained.

```
rev ([a], [a]) :- I ([a]),
                 C ( [ ], [a]),
                 rev ([ ], [ ]),
                 A ([a], [ ], [a]).                ... (4)
```

Thus, from two successive input/output examples, input/output examples of subprograms "I", "C", and "A" can be obtained. When the program generating apparatus 31 retrieves the subprograms from the reference program cache table 14 or the reference program database 15 with keys of the obtained input/output examples, real expressions of the subprograms "T", "C", and "A" can be obtained. The first section (stop section) of the schema [4'] can be specialized by the last input/output examples "{rev+ ([ ], [ ])". Likewise, the predicates "E" and "B" can be obtained.

The resultant program "rev" can be represented, for example, as follows.

```
rev ([ ], [ ]).
rev (Ys, [X | Xs]) :- rev (Zs, Xs),
                     concat (X, Zs, YS).        ... (5)
``` where "concat (X, Y, Z)" is a subprogram for adding the first argument X to the end of the list Y of the second argument, and designating the result to the third argument Z.

As can easily be analogized from the above description, when a pre-developed program can be used as each subprogram, assuming that the number of times the function "F" appears, which represents the type of a program, is R in the employed schema, the number of supplied input/output examples is at most R. In this case, the number of times the function "rev" is in the recursive section is two, and in the stop section is one. Thus, with at most three input/output examples, the program "rev" can be synthesized. In addition, when an input/output example that specializes the stop section is included in an input/output example that specializes the recursive section, the program "rev" can be synthesized with at least two input/output examples. Thus, when the synthesizing portion 53 that has such features is provided, the number of input/output examples necessary for generating a program can be significantly reduced.

Figure 10:
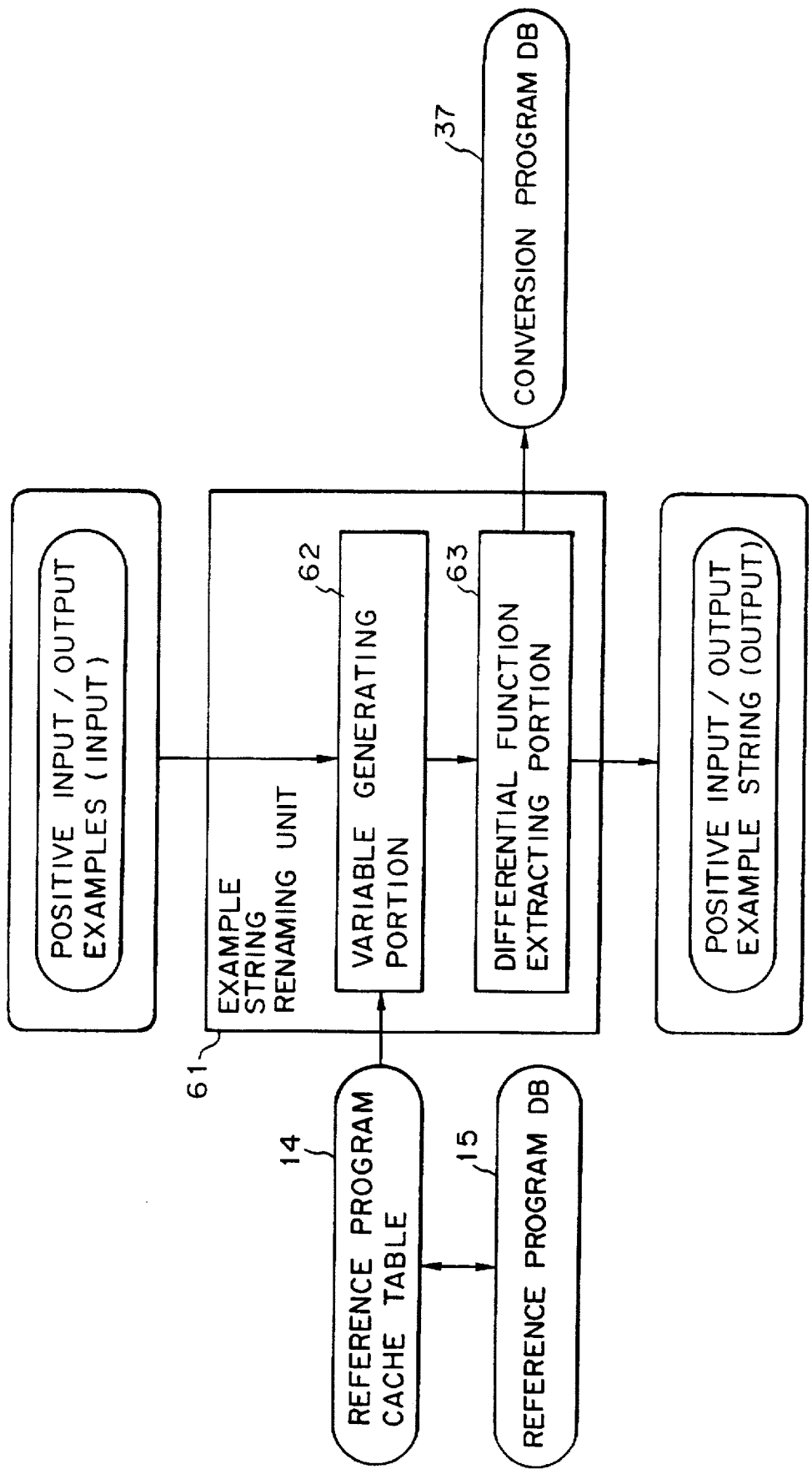
FIG. 10 is a block diagram showing the construction of an example string renaming unit according to the second embodiment of the present invention.

FIG. 10 is a block diagram showing the configuration of an example string renaming unit disposed in the example string analyzing portion 52 shown in FIG. 9. The example string renaming unit 61 shown in FIG. 10 comprises a variable generating portion 62 and a differential function extracting portion 63.

The variable generating portion 62 receives positive input/output examples and selectively changes atoms included therein to variables. When a pre-developed program is used, an argument to be changed to a variable is selected corresponding to information received from the reference program database 15 that stores the pre-developed program or from the reference program cache table 14 that stores part information thereof.

The differential function extracting portion 63 receives a positive input/output example string of which an atom included therein has been selectively changed to a variable from the variable generating portion 62 and detects the difference in data structures of two successive input/output examples for each argument. A function for obtaining the difference is stored as a differential function in the conversion program database 37. Thus, a differential function for obtaining an input/output example corresponding to another input/output example can be stored in the conversion program database 37. A differential function for a special data structure is stored when required. Thus, it is not necessary to pre-store all conversion programs in the conversion program database 37. Consequently, the number of conversion programs stored in the program database 37 that significantly affect the number of calculations can be minimized.

For example, to obtain a program "even" for defining an even number, a positive input/output example string "{even+ (4), even+ (2), even+ (0)}" will be exemplified. In this case, the differential function extracting portion 63 stores a differential function equivalent to "y=x+2" in the conversion program database 37. When the third input/output example "0" is substituted into "x", "2" is obtained as "y". The result accords with the second input/output example. Likewise, when the second input/output example "2" is substituted into the differential function, the first input/output example "4" is obtained.

In addition, the differential function extracting portion 63 performs a renaming process for unifying character atoms that have been changed to variables and outputs the result. The renaming process is a process for selectively renaming the names of arguments so that input/output examples are properly arranged.

Generally, the names of arguments of real input/output examples only represent the positions thereof. The names of the arguments semantically accord with variables except that a special semantic is pre-defined by a pre-developed program, or the names of the arguments are numerical values. The example string renaming unit 61 selectively changes each character atom to a variable without such exceptions, calculates the difference between two successive input/output examples, and properly re-embodies an input/output example string.

Next, a practical example of the renaming process will be described. In this case, assume that the program generating apparatus 31 using the expressions (2), (3), and (4) unsuccessfully terminates the retrieving process for a pre-developed program. In this case, a program inventing portion 54, instead of the program retrieving unit 21 of the program generating apparatus 31, tries to generate a new program. The program finding portion 54 supplies a new program name to the program generating apparatus 51 according to the second embodiment, so that it recursively generates a new program.

For example, from the expressions (2), (3), and (4), in the example of the function "rev", the input/output example string that satisfies the subprogram A should be "{A+([a, b, c], [a, b], [c, b, a]), A+([a, b], [a], [b, a]), A+([a], [ ], [a])}". However, when the adaptive converting portion 35 applies the function "car" only to the third argument, the input/output example string that a new program "newp" should satisfy is "{(newp+ ([a, b, c], [a, b], c), newp+ ([a, b], [a], b), newp+ ([a], [ ], a)}".

The program inventing portion 54 supplies the input/output example string to the program generating apparatus 51. This input/output example string is a positive input/output example string of a program for adding a character atom of the third argument to the end of the list of the second argument and designating the result to the first argument. However, the contents of the positive input/output example string are not always suitable for the processes that follow.

The example string renaming unit 61 obtains the differential function between each input/output example and rewrites the second input/output example "newp+ ([a, b], [a], b)" to "newp+ ([b, c], [b], c)", and the third input/output example "newp+ ([a], [ ], a)" to "newp+ ([c], [ ], c)". Thus, the example string renaming unit 61 outputs a positive input/output example string "{newp+ ([a, b, c], [a, b], c), newp+ ([b, c], [b], c), newp+ ([c], [ ], c)}" of which the names of atoms have been renamed, and outputs the resultant string to the synthesizing portion 53 portion 53. Thus, the synthesizing portion 53 successfully generates the program "newp".

In this case, the obtained program "rev" is expressed by the subprogram "newp" as follows.

```
rev ([ ], [ ]).
rev (Ys, [X | Xs]) :- rev (Zs, Xs),
```

```
                newp (Ys, Zs, X).
newp ([X], [ ], X).
newp ([Y | Zs], [Y | Ys], X) :- newp (Zs, Ys, X).
                                                    ... (6)
```

The newly generated subprogram "newp (X, Y, Z)" is a program for adding the third argument Z to the end of the list Y of the second argument and designating the result to the first argument X. The first argument, the second argument, and the third argument of the subprogram "newp (X, Y, Z)" accord with the third argument, the second argument, and the first argument of the program "concat", respectively.

Even if a pre-developed program cannot be reused, when the program inventing portion 54 is provided, desired subprograms can be newly generated. The program generating apparatus 51 of the second embodiment can generate subprograms without external information. Thus, according to the second embodiment, subprograms can be automatically generated and thereby a desired program can be effectively synthesized.

As is clear from the above-described example, recursive schemas do not depend on the type of data at all. In addition, the program generating method does not depend on the type of data at all. In practice, according to the second embodiment, programs that handle numeric values, terms, and so forth along with lists, can be generated. In addition, when recursive schemas are used and input/output examples are restrictively supplied, programs can be effectively generated. Thus, unlike with the related art references, the heuristic technique is not required.

In addition, a recursive schema and a converted program can be added and modified by the schema database 55 and the conversion program database 37, which are disposed outside the program generating apparatus 51. Thus, the programs can be easily extended.

Figure 11:
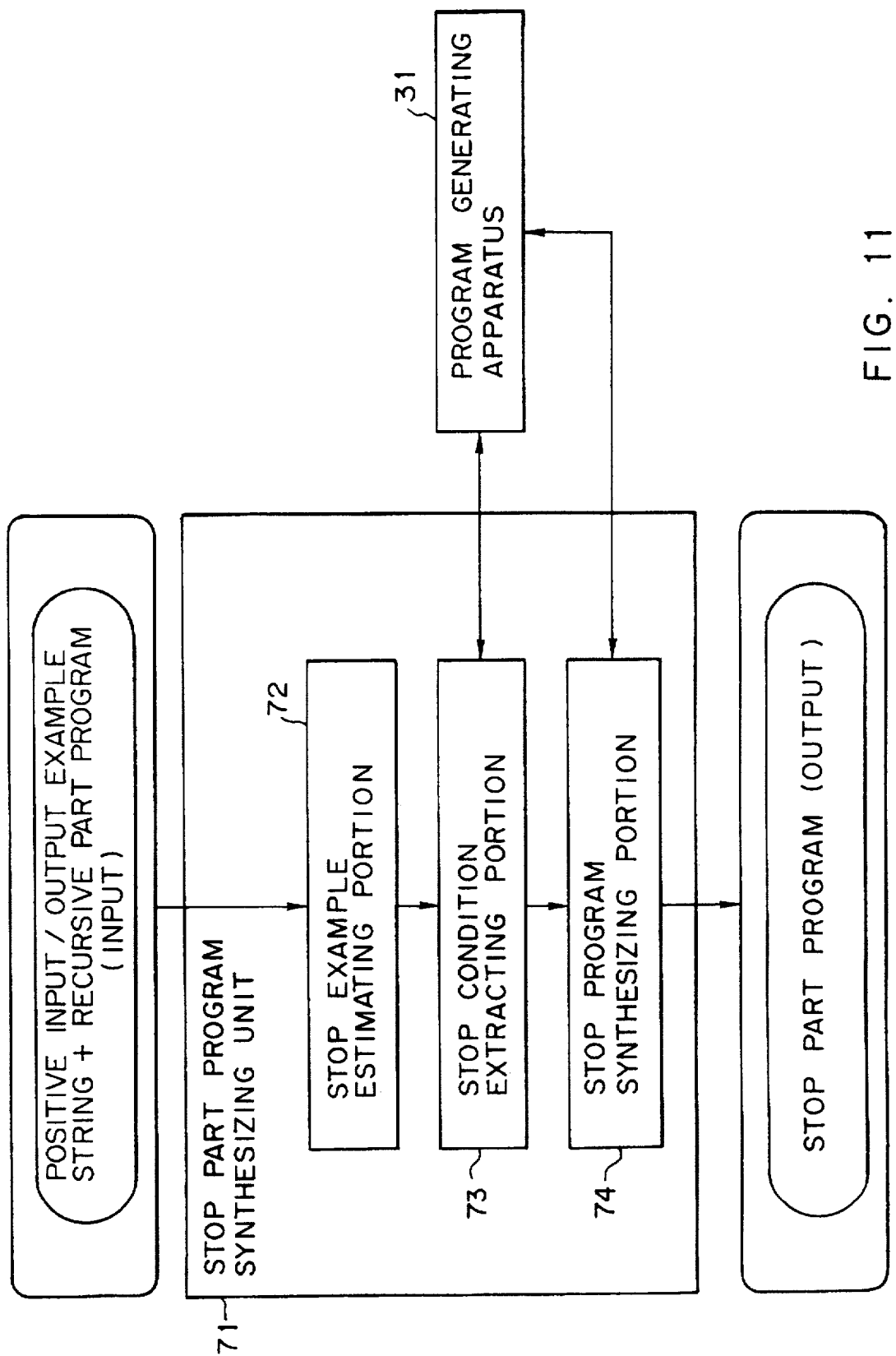
FIG. 11 is a block diagram showing the construction of a stop part program synthesizing unit according to the second embodiment of the present invention.

FIG. 11 is a block diagram showing the construction of a stop part program synthesizing unit disposed in the synthesizing portion 53 shown in FIG. 9. A stop part program synthesizing unit 71 shown in FIG. 11 comprises a stop example estimating portion 72, a stop condition extracting portion 73, and a stop program synthesizing portion 74. The stop part program synthesizing unit 71 automatically synthesizes a program of a stop part that does not include a recursive part (this stop part is equivalent to the stop section of a recursive schema) with a synthesized recursive part (equivalent to the recursive section of a recursive schema) and a positive input/output example.

The stop example estimating portion 72 continuously applies the recursive part program to each of the received positive input/output examples until the application is unsuccessfully terminated or the application is repeated for a predetermined number of times. Thus, the stop example estimating portion 72 estimates a stop input/output example that represents the end of the recursion.

The stop condition extracting portion 73 causes the program generating apparatus 31 of the first embodiment to obtain a stop condition that does not satisfy other positive input examples, but only positive stop input examples. The positive input examples represent input part examples included in positive input/output examples.

The stop program synthesizing portion 74 causes the program generating apparatus 31 to obtain a program that satisfies the stop input/output example, synthesizes the program and stop conditions obtained by the stop condition extracting portion 73, generates a stop part program, and outputs the stop part program.

To effectively retrieve a program, it is necessary to minimize the number of input/output examples supplied to the program generating apparatus 31. In this case, an input/output example string that includes a stop input/output example should be supplied. However, the amount of information in the vicinity of the stop input/output example is small. Thus, many alternative programs may be generated. For example, in the case of the above-described program "rev", when all subprograms can be accomplished by using pre-developed programs, the minimum number of input/output examples is two. In addition, since the input/output example string should include a stop input/output example "rev+ ([ ], [ ])", "{rev+ ([a], [a]), rev+ ([ ], [ ])}" is exemplified. However, there are many programs that satisfy such conditions. Examples of these programs are "X=Y" and "X==Y".

When the stop part program synthesizing unit 71 is provided, a stop input/output example "rev+ ([ ], [ ])" can be automatically estimated from two input/output examples "{rev+ ([a, b, c], [c, b, a]), rev+ ([a, b], [b, a])}" that contain a lot of information. In addition, corresponding to the estimated stop input/output example, a stop part program can be generated. Thus, the number of input/output examples supplied to the program generating apparatus 31 can be reduced and the number of alternatives of the desired program can be limited.

Figure 12:
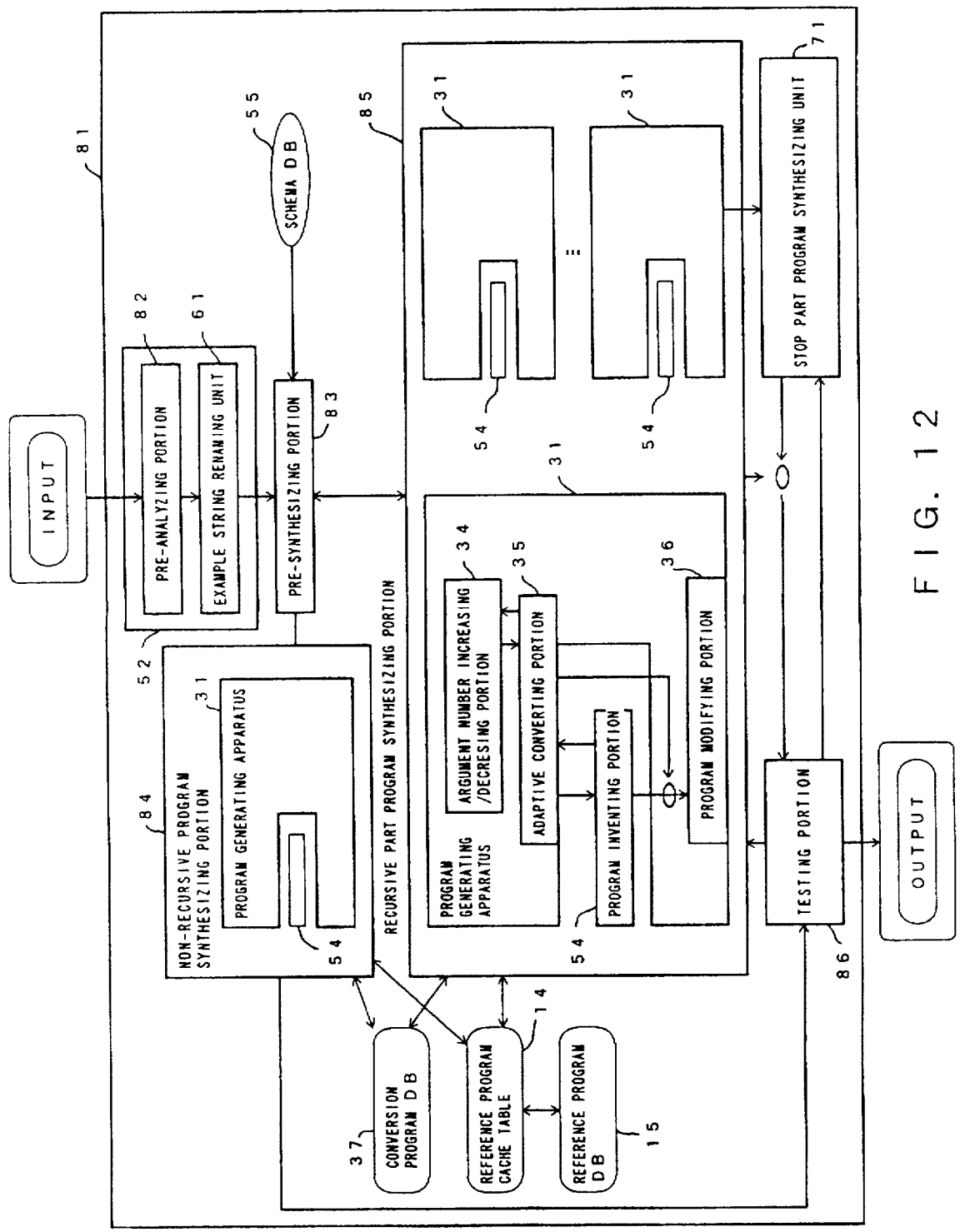
FIG. 12 is a block diagram showing another construction of the program generating apparatus according to the second embodiment of the present invention.

FIG. 12 is a block diagram showing another construction of the program generating apparatus according to the second embodiment of the present invention. In FIG. 12, for simplicity, portions similar to those of FIGS. 9, 10, and 11 are denoted by the same reference numerals. A program generating apparatus 81 shown in FIG. 12 comprises an example string analyzing portion 52, a pre-synthesizing portion 83, a non-recursive program synthesizing portion 84, a recursive part program synthesizing portion 85, a testing portion 86, a stop part program synthesizing unit 71, a schema database 55, a conversion program database 37, a reference program cache table 14, and a reference program database 15. The processes performed by the pre-synthesizing portion 83, the non-recursive program synthesizing portion 84, the recursive part program synthesizing portion 85, the testing portion 86, and the stop part program synthesizing unit 71 accord with those performed by the synthesizing portion 53, the program inventing portion 54, and the program generating apparatus 31 shown in FIG. 9.

The example string analyzing portion 52 comprises a pre-analyzing portion 82 and an example string renaming unit 61. The non-recursive program synthesizing portion 84 comprises a program generating apparatus 31 according to the first embodiment and a program inventing portion 54. The recursive part program synthesizing portion 85 comprises a plurality of sets of the program generating apparatuses 31 according to the first embodiment, and the program inventing portions 54. The program generating apparatus 81 basically performs the same process as the program generating apparatus 51 shown in FIG. 9 and generates a program that accords with the supplied positive/negative input/output example string.

In FIG. 12, the conversion program database 37, the reference program cache table 14, the reference program database 15, and the schema database 55 are disposed inside the program generating apparatus 81. However, it should be noted that part or all of these portions may be disposed outside the program generating apparatus 81.

Figure 13:
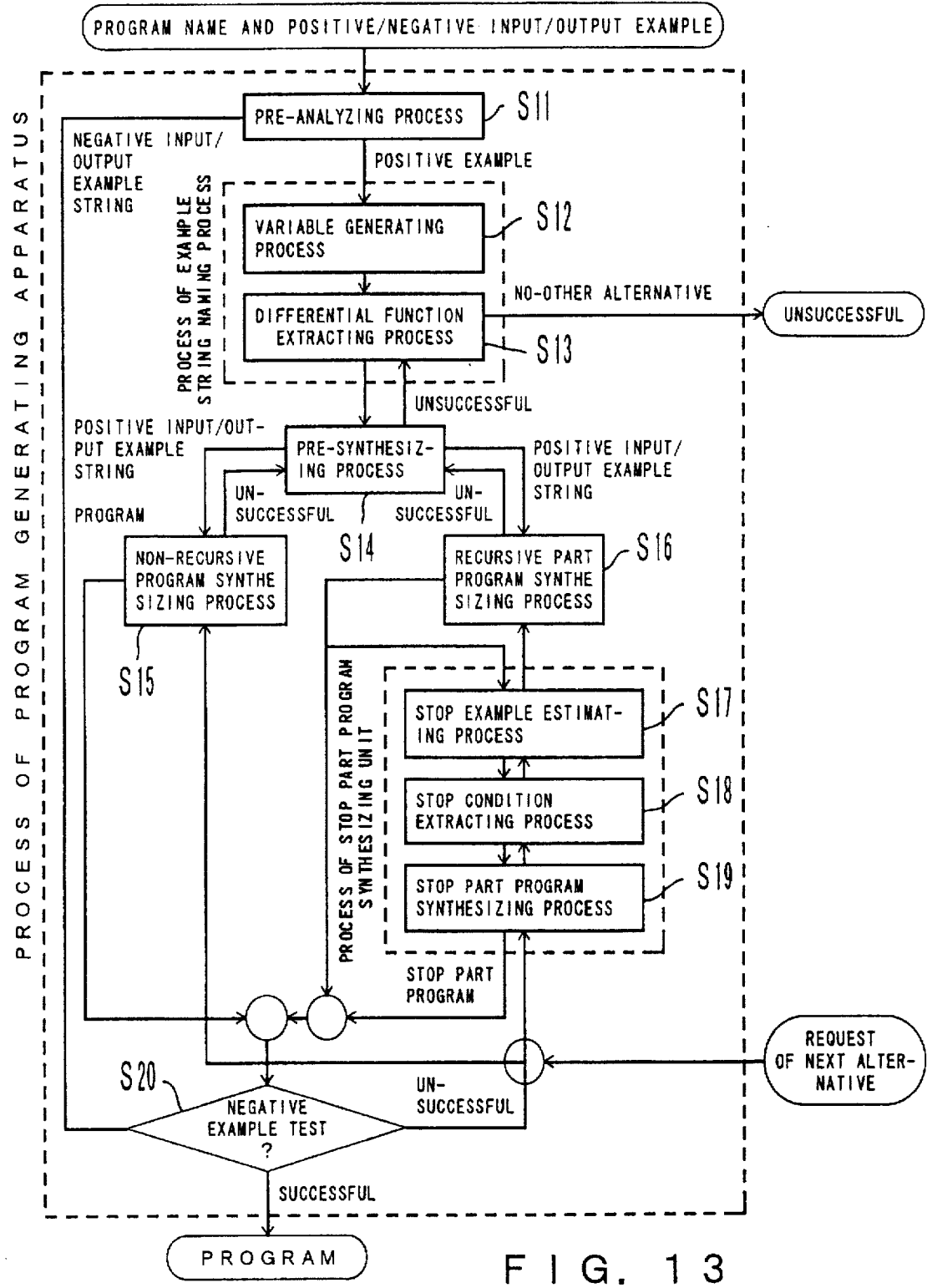
FIG. 13 is an operating flow chart showing a program generating process according to the second embodiment of the present invention.

FIG. 13 is a operating flow chart showing a program generating process performed by the program generating apparatus 81 according to the second embodiment of the present invention. In FIG. 13, when a positive/negative input/output example string and the program name of a desired program are supplied, the following processes are performed.

(Step S11) Pre-analyzing process

The pre-analyzing portion 82 receives a positive/negative input/output example string and a program name, separates each input/output example into a positive input/output example and a negative input/output example, and supplies the positive input/output example to the example string renaming unit 61 and the negative input/output example to the testing portion 86.

(Step S12) Variable generating process

The variable generating portion 62 in the example string renaming unit 61 substitutes undefined character atoms in other than the first input/output example of the supplied positive input/output example string into different variables. In this case, the undefined character atoms represent character atoms that are not numerical values and that are not defined in the reference program data base 15. The substituted results are supplied to the differential function extracting portion 63.

For example, the variable generating process is performed, an input/output example string "{(4, [a, b, c, d]), (2, [a, b]), ... }" is changed to a string "{(4, [a, b, c, d]), (2, [α, β], ... }" (where "a", "b", and so forth are undefined character atoms and "α", "β", and so forth are variables).

(Step S13) Differential function extracting process

The differential function extracting portion 63 extracts a function "tr" for obtaining two adjacent input/output examples from an input/output example string that has been changed to variables. When the function "tr" is applied to one of arguments corresponding to any adjacent two input/output examples, the output value is the other argument. In this case, when the function "tr" is applied to an argument of the later input/output example, an argument of the preceding input/output example can be obtained. When the obtained function "tr" has not been stored in the conversion program database 37, it is stored therein.

However, the function "tr" is expressed in the format in which a particular constant is input to another argument of a function of the conversion program database 37. Alternatively, when two input/output examples are terms, the function "tr" can be expressed in the format of "tr (X)=t(X)". In this case, "t(X)" is a term that includes a variable "X".

When an input/output example string "{(4, [a, b, c, d]), (2, [α, β]), ... }" is received, "tr" for the first argument of the two input/output examples can be expressed as "tr(X)=X+2". "tr(X)" can be obtained when a two-argument function "+" has been stored in the conversion program database 37. In this case, the first argument is "X", whereas the other argument is a constant "2". "tr" for the second argument can be expressed as "tr(X)=[a, b, IX]".

When the matching result of the differential function extracting process is applied to each input/output example, the renaming process is executed at the same time. In the renaming process, when "X=[α, β]" is substituted into "tr (X)" for the second argument, the following expression can be obtained.

$$[a, b, c, d] = tr\ ([\alpha, \beta])$$
$$= [a, b \mid [\alpha, \beta]] \quad \ldots (7)$$

From the expression (7), since it is clear that α=c and β=d, a new positive input/output example string "({4, [a, b, c, d]), (2, [c, d]), ... }" can be obtained.

The obtained positive input/output example string is supplied from the differential function extracting portion 63 to the pre-synthesizing portion 83.

Pre-synthesizing process (at step S14)

When the pre-synthesizing portion 83 receives a positive input/output example string, it selects a suitable schema from the schema database 55. When the selected schema is a non-recursive schema, the schema and the positive input/output example are supplied to the non-recursive program synthesizing portion 84. The non-recursive schema is a schema that does not include a calling program name (namely, a predicate name at the beginning). For example, a non-recursive schema is a schema composed of only the first section of the schema [4'].

When the selected schema is a recursive schema, the schema and the positive input/output example are supplied to the recursive part program synthesizing portion 85. A recursive schema is a part schema that includes a calling program name (a predicate name at the beginning) (for example, a schema including the second section of the schema [4']).

If the non-recursive program synthesizing portion 84 or the recursive part program synthesizing portion 85 unsuccessfully terminates a non-recursive program synthesizing process or a recursive part program synthesizing process (that will be described later), the pre-synthesizing portion 83 selects another alternative from the schema database 55 and supplies the selected alternative schema to the non-recursive program synthesizing portion 84 or the recursive part program synthesizing portion 85.

If there is no alternative schema, the pre-synthesizing portion 83 causes the example string renaming unit 61 to obtain another positive input/output example string and supplies it to the differential function extracting portion 63. The differential function extracting portion 63 performs the differential function extracting process. When another positive input/output example string is obtained, the differential function extracting portion 63 supplies it to the pre-synthesizing portion 83. When another positive input/output example string cannot be obtained, the program generating process is unsuccessfully terminated.

(Step S15) Non-recursive program synthesizing process

The non-recursive program synthesizing portion 84 performs a subprogram generating process with the received positive input/output example and non-recursive schema. The subprogram generating process will be described with reference to FIG. 14. When the subprogram generating process is unsuccessfully terminated, the flow returns to step S14. At step S14, the pre-synthesizing process is performed. When the subprogram generating process is successfully completed, the obtained program is supplied to the testing portion 86.

(Step S16) Recursive part program synthesizing process

The recursive part program synthesizing portion 85 separates the received recursive schema into a recursive part schema and a non-recursive part schema (stop schema). In the case of the schema [4'], the recursive section is a recursive part schema, whereas the stop section is a non-recursive part schema. The subprogram generating process is performed with the recursive part schema and the positive input/output example. When the recursive part schema includes a plurality of subprograms, a plurality of program generating apparatuses 31 that correspond thereto are used. When the subprogram generating process is unsuccessfully terminated, the flow returns to step S14. At step S14, the pre-synthesizing process is performed. When the subprogram generating process is successfully completed, the obtained recursive part program is supplied to the testing portion 86. In addition, the positive input/output example, the non-recursive part schema, and the recursive part program are supplied to the stop part program synthesizing unit 71.

(Step S17) Stop example estimating process

The stop example estimating portion 72 in the stop part program synthesizing unit 71 applies the recursive part program to the last positive input/output example of the received positive input/output example string. The stop example estimating process is continued until it is unsuccessfully terminated or for a predetermined number of times so as to estimate a stop input/output example. All input/output examples from the end of the positive input/output example string to the last input/output example newly generated by the application of the recursive part program are stop input/output example alternatives.

(Step S18) Stop condition extracting process

The stop condition extracting portion 73 causes the program generating apparatus 31 in the recursive part program synthesizing portion 85 to obtain a condition that satisfies only stop input examples, not other input examples. When the stop condition extracting process is unsuccessfully terminated, the related processes are performed in the reverse order so as to obtain another alternative. Thereafter, the stop condition extracting process is performed.

(Step S19) Stop part program synthesizing process

The stop program synthesizing portion 74 performs the subprogram generating process with a non-recursive schema excluding a stop condition part and a stop input/output example so as to obtain a program that satisfies the stop input/output example. The stop part program synthesizing portion 74 synthesizes a stop part program with the obtained program and the stop condition received from the stop condition extracting portion 73. The obtained stop part program is supplied to the testing portion 86. When the stop part program synthesizing process is unsuccessfully terminated, the related processes are preformed in the reverse order so as to obtain another alternative. Thereafter, the stop part program synthesizing process is performed.

(Step S20) Negative example test

The testing portion 86 tests a program received from the non-recursive program synthesizing portion 84. Alternatively, the testing portion 86 tests a program in which a recursive part program received from the recursive part program synthesizing portion 85, and a stop part program received from the stop part program synthesizing unit 71, have been synthesized. In this test, a negative input/output example received from the pre-analyzing portion 82 is used. The testing portion 86 applies an input example included in the negative input/output example to a program, obtains the output of the program, and determines if the output does not accord with an output example included in the negative input/output example.

If the same output as an output example of the negative input/output example is obtained, the program is invalid. In this case, the related processes are performed in the reverse order so as to obtain another alternative. Thereafter, the negative example test is performed. When the test is successfully completed, the program is output. When a negative input/output example is not received from the pre-analyzing portion 82, the negative example test is not performed.

After a program that is successful in the negative example test is output, when the user requests another alternative program, the non-recursive program synthesizing process, the stop part program synthesizing process, the stop condition extracting process, the stop example estimating process, the recursive part program synthesizing process, the pre-synthesizing process, and the differential function extracting process are performed and then the next alternative is output.

Figure 14:
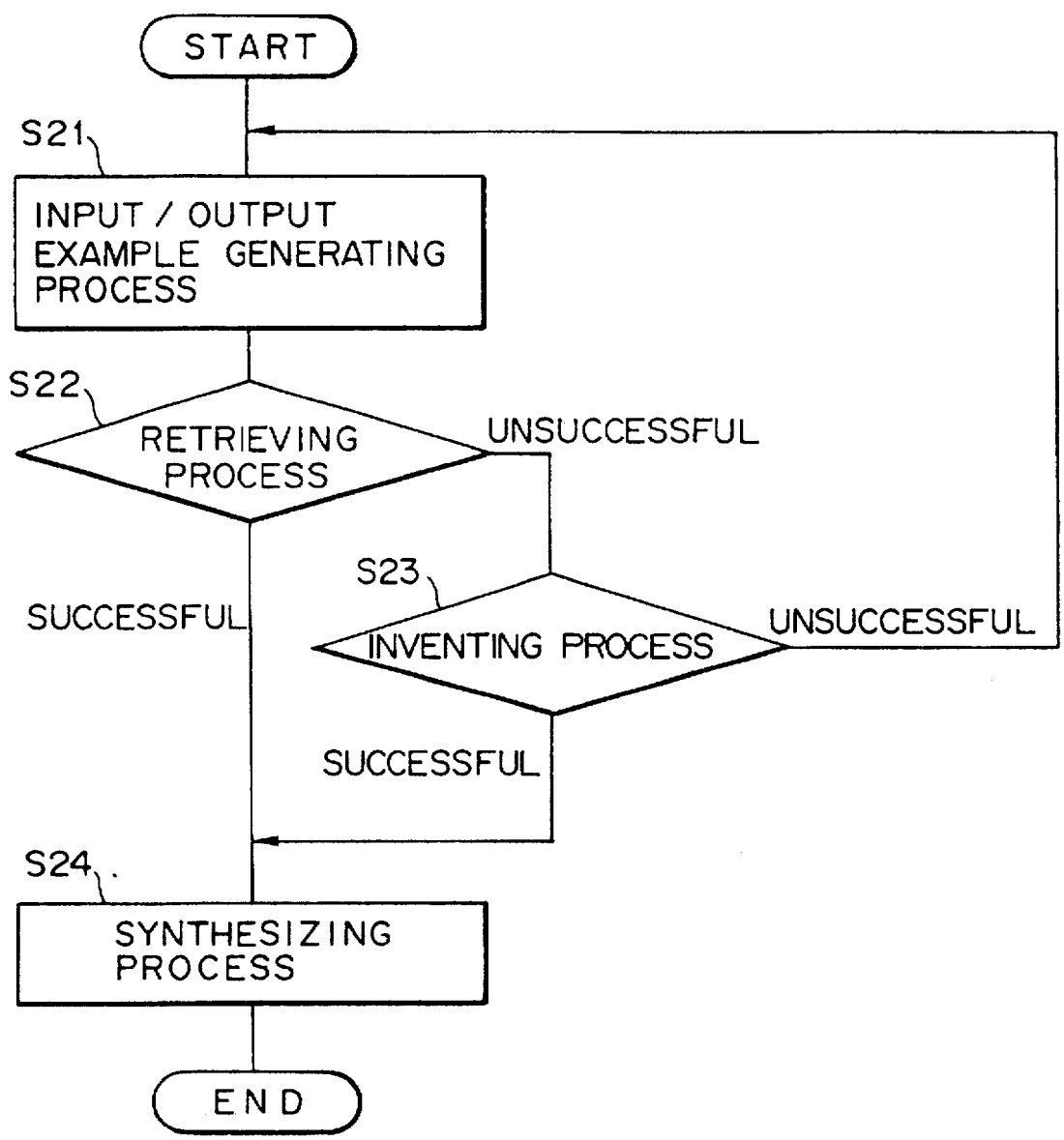
FIG. 14 is an operating flow chart showing a subprogram generating process according to the second embodiment of the present invention.

FIG. 14 is an operating flow chart showing a subprogram generating process. The subprogram generating process shown in FIG. 14 is performed by the non-recursive program synthesizing portion 84, the recursive part program synthesizing portion 85, and the stop part program synthesizing unit 71. The subprogram generating process is composed of the following processes.

(Step S21) Input/output example generating process

Fixed examples of positive input/output examples are successively substituted into predicates defined by a supplied schema (namely, arguments of predicates "F" in the schema) and the arguments are embodied so as to obtain positive input/output examples of each subprogram included in the schema. Each obtained positive input/output examples of the subprograms is divided into a direct input/output part example and an indirect input/output part example. For example, in the above-described Prolog schema [4'], parts equivalent to arguments "Y" and "PY" of the subprogram "A ([Y, PY|Xs])" are direct input/output part examples, whereas the part equivalent to the argument "Xs" is an indirect input/output part example.

(Step S22) Retrieving process

The direct input/output part examples and the indirect input/output part examples obtained at step S21 are supplied to the program generating apparatus 31 so as to retrieve a subprogram corresponding thereto. As a result, when a pre-developed program that can be used is found as the subprogram, the process at step S24 is performed. Otherwise, the process at step S23 is performed.

(Step S23) Finding process

The program generating apparatus 31 performs an argument number increasing/decreasing process and an adaptive converting process so as to obtain a new positive input/output example. Thereafter, the program finding portion 54 generates a new program name and recursively supplies the new program name along with the new positive input/output example to the program generating apparatus 81 so as to obtain a new program. The adaptive converting process and the argument number increasing/decreasing process are performed so as to generate other input/output examples until a new program is obtained. Thereafter, the inventing process is performed. If another input/output example cannot be obtained, the inventing process is unsuccessfully terminated. Thus, the flow returns to step S21. At step S21, another positive input/output example of a subprogram is generated.

When a new program is obtained, the adaptive modifying process is performed by the program modifying portion 36 in the program generating apparatus 31. Thereafter, the new program is modified and the process at step S24 is performed.

(Step S24) Synthesizing process

When all subprograms of the schema are obtained by the retrieving process at step S22 or the finding process at step S23, the subprograms are substituted into the schema. The results are synthesized as one program and are outputted. When any required subprogram cannot be obtained, the subprogram generating process is unsuccessfully terminated.

As described above, when the program generating apparatus 81 according to the second embodiment is provided, a desired program can be automatically generated from an imperfect specification composed of, for example, two or three input/output examples.

In the second embodiment, a negative example test is performed using negative input/output examples that have been received. However, whenever an alternative program to be output is obtained, the user may input a negative input/output example corresponding to the alternative program so as to perform the negative example test.

Next, with reference to FIGS. 15 to 19, the program generating process will be described in detail.

Figure 15:
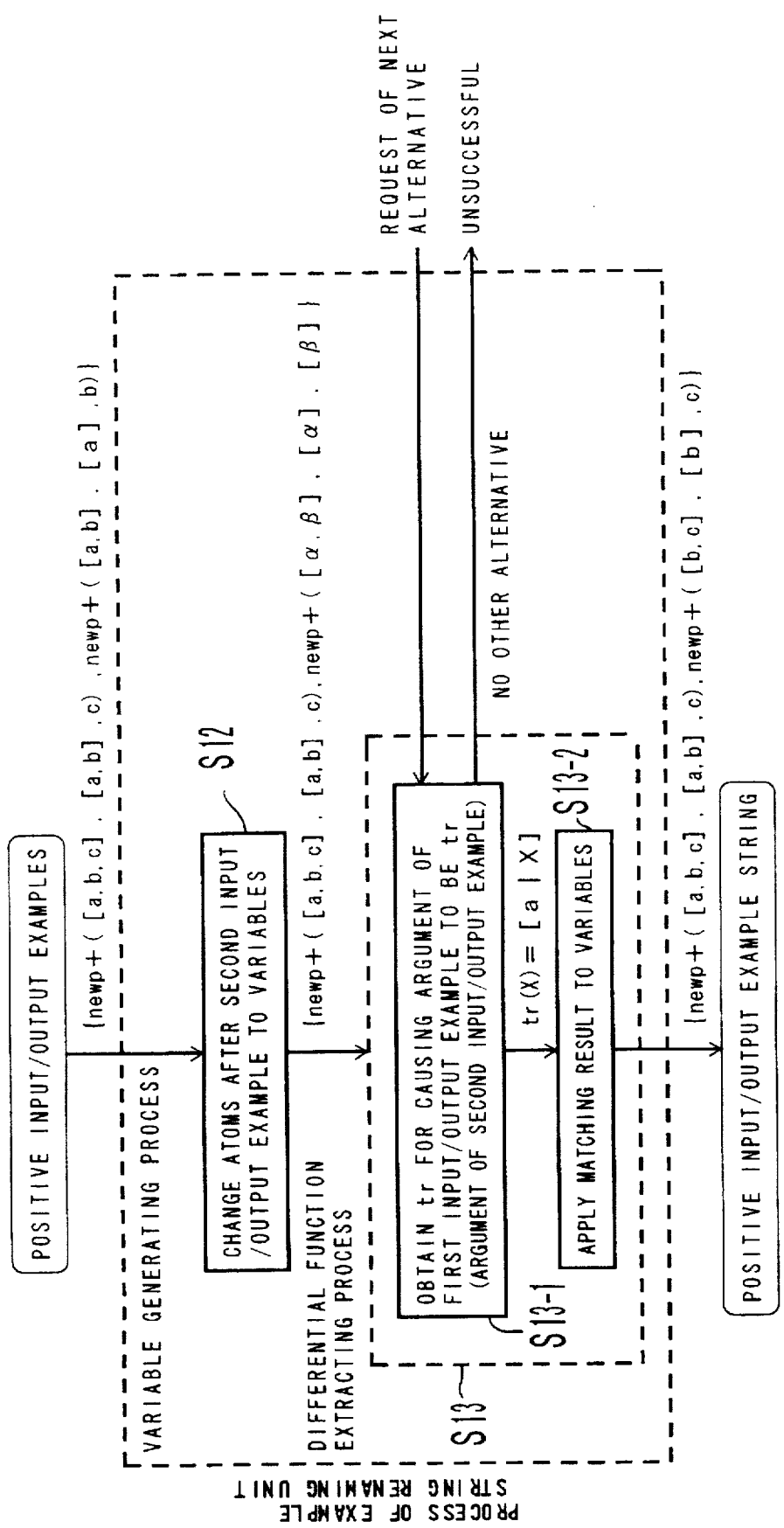
FIG. 15 is a detailed operating flow chart showing the processes performed by the example string renaming unit according to the second embodiment of the present invention.

FIG. 15 is a detailed operating flow chart showing processes performed by the example string renaming unit 61. In FIG. 15, a variable generating process and a differential function extracting process are performed for a real input/ output example. The processes shown in FIG. 15 accord with the processes at steps S12 and S13 shown in FIG. 13.

In FIG. 15, assume that a positive input/output example string such as "{newp+ ([a, b, c], [a, b], c), newp+ ([a, b], [a], b)}" is supplied to the variable generating portion 62. The variable generating portion 62 changes atoms after the second input/output example to variables (at step S12). In this case, "a" and "b" of the second input/output example "newp+ ([a, b], [a], b)" are replaced with variables "α" and "β" and thereby "newp+ ([α, β], [α], β)" is generated.

Thereafter, the differential function extracting portion 63 obtains a function "tr" for causing an argument of a first input/output example to be "tr (an argument of the next input/output example)" for each argument (at step S13-1). In this case, "tr (X)=[a|X]" is obtained for the first argument and the second argument.

Thereafter, the matching result of the input/output examples using the function "tr" is applied to variables included in the second and later input/output examples (at step S13-2). In this case, from the matching result of the first argument and the second argument, α=b and β=c are obtained. Thus, a positive input/output example string "{newp+ ([a, b, c], [a, b], c), newp+ ([b, c], [b], c)}" is output.

When the pre-synthesizing portion 83 or the user requests another input/output example string, the differential function extracting portion 63 obtains another "tr" (at step S13-1). The differential function extracting portion 63 generates a new input/output example string corresponding to "tr" and supplies it to the pre-synthesizing portion 83. If the differential function extracting portion 63 cannot obtain another "tr", the program generating process is unsuccessfully terminated.

Figure 16:
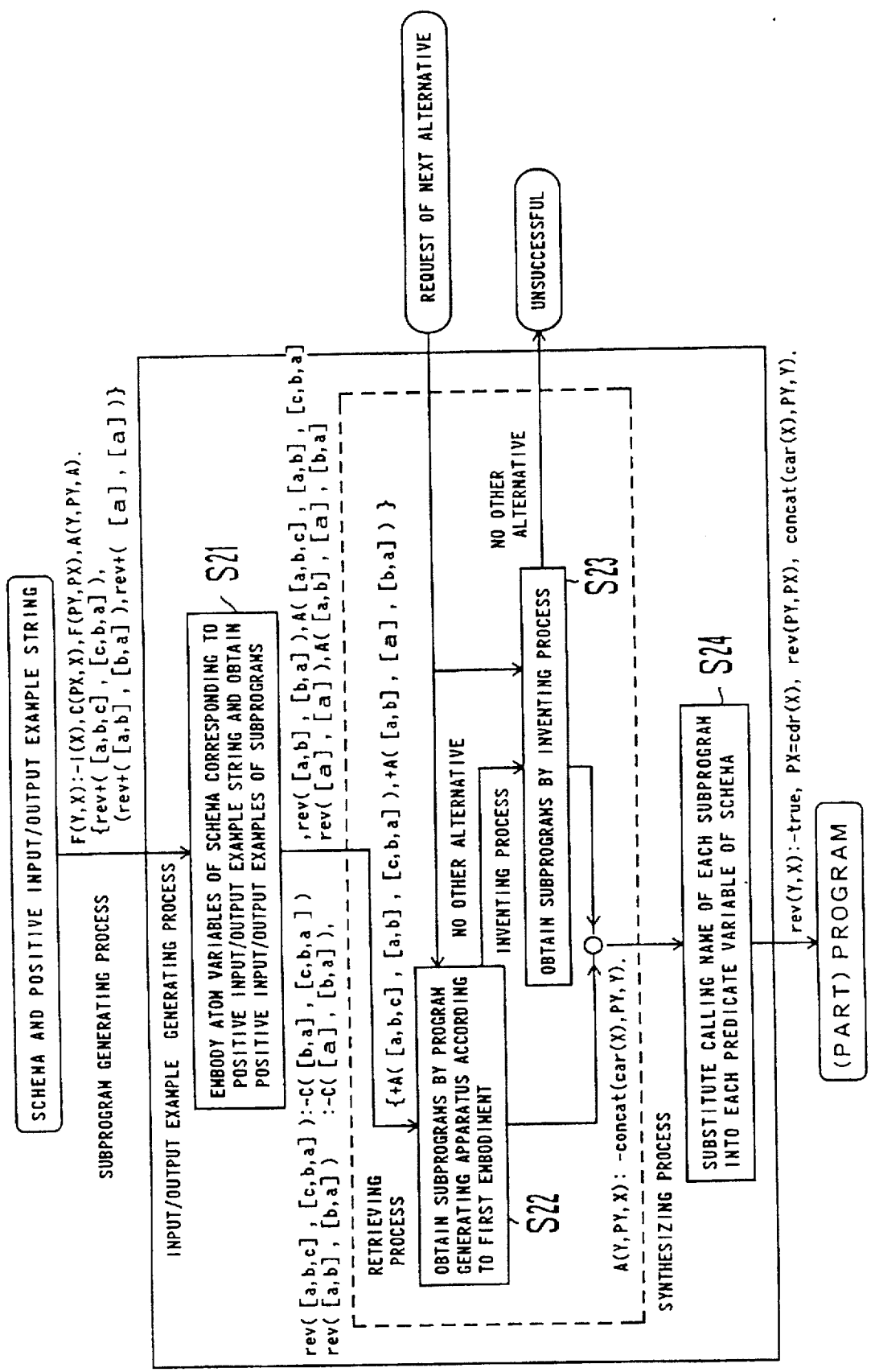
FIG. 16 is a detailed operating flow chart showing a subprogram generating process according to the second embodiment of the present invention.

FIG. 16 is a detailed operating flow chart showing a subprogram generating process. In FIG. 16, the subprogram generating process is performed for real input/output examples. The subprogram generating process shown in FIG. 16 accords with the process shown in FIG. 14.

In FIG. 16, assume that the following recursive part schema $$F (Y, X) :- \\ I (X), C (PX, X), F (PY, PX), A (Y, PY, X) \quad \ldots (8)$$

and a positive input/output example string "{rev+ ([a, b, c], [c, b, a]), rev+ ([a, b], [b, a]), rev+ ([a], [a])}" are supplied to the recursive part program synthesizing portion 85.

Thus, the recursive part program synthesizing portion 85 embodies constant variables of the recursive part schema corresponding to the positive input/output example string so as to obtain positive input/output examples for the subprograms of the recursive part schema (at step S21). In this case, since the predicate I (X) has not been defined, I (X) is initialized to true and the positive input/output example string is substituted into the rest of the predicates of the recursive part schema.

In the expression (8), assuming that "F=rev, Y=[a, b, c], X=[c, b, a], PY=[a, b], and PX=[b, a]", the following expression can be obtained.

$$\text{rev ([a, b, c], [c, b, a]) :-} \\ \text{C ([b, a], [c, b, a]), rev ([a, b], [b, a]),} \\ \text{A ([a, b, c], [a, b], [c, b, a]).} \quad \ldots (9)$$

On the other hand, assuming that "F=rev, Y=[a, b], X=[b, a], PY=[a], and PX=[a]", the following expression can be obtained.

$$\text{rev ([a, b], [b, a]) :-} \\ \text{C ([a], [b, a]), rev ([a], [a]),} \\ \text{A ([a, b], [a], [b, a]).} \quad \ldots (10)$$

From the expressions (9) and (10), positive input/output example strings corresponding to the subprograms C and A are expressed by "{+C ([b, a], [c, b, a]), +C ([a], [b, a])}" and "{+A ([a, b, c], [a, b], [c, b, a]), +A ([a, b], [a], [b, a])}", respectively.

The positive input/output example strings obtained by the recursive part program synthesizing portion 85 are supplied to the program generating apparatus 31 according to the first embodiment so as to obtain subprograms (at step S22). In the retrieving process at step S22, if there is no other alternative and thereby a subprogram cannot be obtained, another subprogram is obtained by the finding process (at step S23). In this case, if there is no other alternative and thereby a subprogram cannot be obtained, the process is unsuccessfully terminated.

In this case, by the retrieving process and the inventing process, as the one example of the subprograms C and A, the following subprograms are obtained.

$$C (PX, X):-PX=cdr (X). \quad (11)$$

$$A (Y, PY, X):-\text{concat (car (X), PY, Y)}. \quad (12)$$

where cdr (X) is a function for subtracting the first element from the list X and outputting the rest of the list.

Thereafter, the recursive part program synthesizing portion 85 substitutes a calling name of each subprogram into each predicate variable of the recursive part schema (at step S24). In this case, in the expression (8), "rev" is substituted into "F"; "true" into "I (X)"; "PX=cdr (X)" into "C (PX, X)"; and "concat (car (X), PY, Y)" into "A (Y, PY, X)". Thus, the following recursive part program can be obtained.

$$\text{rev (Y, X):-true, PX=cdr (X), rev (PY, PX), concat (car (X), PY, Y)}$$

When the user requests the next alternative program, the retrieving process or the finding process is performed. Thus, the next alternative of the recursive part program is output.

FIG. 17 is a detailed operating flow chart showing the inventing process at step S23 of FIG. 16. In this case, assume that the inventing process is performed using a positive input/output example string "{+A ([a, b, c], [a, b], [c, b, a]), +A ([a, b], [a], [b, a])}" for the subprogram A.

The program inventing portion 54 causes the argument number increasing/decreasing portion 34 and the adaptive conversion portion 35 in the program generating apparatus 31 to perform the argument number increasing/decreasing process and the adaptive converting process, respectively, so as to obtain a new positive input/output example string (at steps S23-1 and S23-2). In this case, the function "car" is applied to the third argument of each positive input/output example of the subprogram A and thereby a new positive input/output example string "{+([a, b, c], [a, b], c), +([a, b], [a], b)}" is obtained.

Thereafter, the program inventing portion 54 generates a new program name corresponding to the new positive input/output example string (at step S23-3). In this case, a new program name "newp" is supplied and thereby the positive input/output example string is expressed as "{newp+ ([a, b, c], [a, b], c), newp+ ([a, b], [a], b)}".

Thereafter, the new program name and the positive input/output example string are recursively supplied to the program generating apparatus 81 according to the second embodiment so as to generate a program that accords with the new positive input/output example string (at step S23-4). If such a program cannot be generated, the next alternative of the positive input/output example string is obtained by the adaptive converting process (at step S23-2). If these processes are unsuccessfully terminated, the next alternative of the positive input/output example string is obtained by the argument number increasing/decreasing process (at step S23-1). The processes after the step S23-2 are repeated. When another positive input/output example string cannot be obtained by the argument number increasing/decreasing process, the inventing process is unsuccessfully terminated.

In this case, the positive input/output example string "{newp+ ([a, b, c], [a, b], c), newp+ ([a, b], [a], b)}" is supplied to the program generating apparatus 81. The string is converted into "{newp+ ([a, b, c], [a, b], c), newp+ ([b, c], [b], c)}" by the process shown in FIG. 15. Corresponding to the positive input/output example string and a proper recursive schema, for example the following program "newp" can be obtained.

$$\text{newp ([X], [ ], X).}$$
$$\text{newp ([Y | Zs], [Y | Ys], X) :- newp (Zs, Ys, X).}$$
$$... (14)$$

The program modifying portion 36 modifies the program of the expression (14) corresponding to the function "car" and supplies the modified program to the testing portion 86.

When the user requests the next alternative program, the processes at steps S23-4, S23-2, and S23-1 are performed in the order and the next program alternative is output.

FIGS. 18 and 19 are detailed operating flow charts showing the processes performed by the stop part program synthesizing unit. In FIGS. 18 and 19, the processes are performed for real input/output examples. The processes shown in FIGS. 18 and 19 accord with the processes from steps S17 to S19 shown in FIG. 13.

In FIG. 18, assume that the following non-recursive part schema, $$F (Y, X):-E (X), B (Y, X). \quad (15)$$

the recursive part program (13) obtained by the processes shown in FIG. 16, and a positive input/output example string "{ rev+ ([a, b, c], [c, b, a]), rev+ ([a, b], [b, a]), rev+ ([a], [a])}" are supplied to the stop part program synthesizing unit 71.

Thus, the stop example estimating portion 72 treats the last input/output example of the received positive input/output example string as "H" and "{H}" as an input/output example string "L" (at step S17-1). In this case, the following expressions are obtained.

$$H:=rev+ ([a], [a])$$
$$L:=\{rev+ ([a], [a])\} \quad (16)$$

Thereafter, the received recursive part program is applied to "H" in the reverse direction (at step S17-2). In other words, "H" is substituted into the first predicate of the recursive part program and thereby another input/output example of the same predicate is obtained. For example, when "rev+ ([a], [a])" of the expression (16) is substituted into "rev (Y, X)" of the expression (13), the following expression is obtained.

$$\text{rev ([a], [a]) :- true, PX = cdr ([a]),}$$
$$\text{rev (PY, PX),}$$
$$\text{concat ( car ([a]), PY, [a]).}$$
$$... (17)$$

From the expression (17), "PY=[ ]" and "PX=[ ]" are obtained. Thus, as another input/output example, "rev+ ([ ], [ ])" is obtained.

When the recursive part program is successfully applied, the obtained input/output example is treated as "H" and "L" is reset to "L+{H}" (at step S17-3). Thereafter, the recursive part program is applied (at step S17-2). This process is repeated until it is unsuccessfully terminated or for a predetermined number of times. Thus, a string "L" of alternatives of the stop input/output examples is obtained. In this case, when the input/output example "rev+ ([ ], [ ])" is substituted into "rev (Y, X)" of the expression (13), the following expression is obtained.

$$\text{rev ([ ], [ ]) :- true, PX = cdr ([ ]),}$$
$$\text{rev (PY, PX),}$$
$$\text{concat ( car ([ ]), PY, [ ]).}$$
$$... (18)$$

Thus, neither "PY=car([ ])" nor "PX=cdr([ ])" can be evaluated. Consequently, since another input/output example cannot be obtained, the process is unsuccessfully terminated. The stop input/output example string "L" is expressed as "{rev+ ([a], [a]), rev ([ ], [ ])}".

When the stop input/output example string "L" is obtained, the stop example estimating portion 72 extracts one input/output example from "L" and supplies it as an alternative of the stop input/output example to the stop condition extracting portion 73 (at step S17-4). In this case, for example "rev ([ ], [ ])" is output as an alternative of the stop input/output example.

The stop condition extracting portion 73 generates an input example string of which only input examples of the stop input/output examples received from the stop example estimating portion 72 are positive input examples, and input examples of the other input/output examples are negative input examples (at step S18-1). In this case, corresponding to the predicate "E", an input example string "{E+([ ]), E−([a]), E−([b, a]), E−([c, b, a])}" is generated.

Thereafter, the input example string is supplied to the program generating apparatus 31 according to the first embodiment so as to obtain a stop condition that satisfies the input example string. The obtained condition is supplied to the stop program synthesizing portion 74 (at step S18-2). In this case, for example, the following condition is obtained.

$$E (X):-X=[ ]. \quad (19)$$

In reality, the condition of the expression (19) is true for only "E+([ ])", whereas it is false for "E−([a]), E−([b, a]), E−([c, b, a])".

The stop program synthesizing portion 74 generates an input/output example string so that the stop input/output example obtained by the stop example estimating portion 72 is a positive input example (at step S19-1). In this case, an input/output example string "{rev ([ ], [ ])}" is generated.

Thereafter, the subprogram generating process is performed using the input/output example string and a non-recursive part schema so as to obtain subprograms included in the non-recursive part schema (at step S19-2). In this case, the following expression of which the predicate "E (x)" of the stop condition is excluded from the non-recursive part schema of the expression (15) is used $$F(Y, X) :- B(Y, X). \tag{20}$$

With the input example string "{rev ([ ], [ ])}", the following program is generated.

$$rev(Y, X) :- Y = [ \ ] \tag{21}$$

When the subprogram generating process is successfully completed, the stop program synthesizing portion 74 links the obtained program and the stop condition received from the stop condition extracting portion 73 and generates a stop part program (at step S19-3). In this case, the stop condition of the expression (19) is associated with the program of the expression (21) and thereby the following stop part program is generated.

$$rev(Y, X) :- X = [ \ ], Y = [ \ ]. \tag{22}$$

The stop program synthesizing portion 74 supplies the generated stop part program to the testing portion 86.

When the stop condition extracting process is unsuccessfully terminated in step S18-2 or when the subprogram generating process is unsuccessfully terminated in step S19-2, the processes after step S17-4 are repeated. When there is no alternative in step S17-4, the process is unsuccessfully terminated.

After the stop part program is output in step S19-3, if the user requests the next alternative of the stop part program, the processes at steps S19-2, S18-2, and S17-4 are performed in order so as to output another stop part program.

Other programs generated by the program generating apparatus 81 according to the second embodiment are, for example, as follows:

```
nat (0) :- true.
nat ( s (X)) :- nat (X)                              ... (23)
fac (1, 0) :- true.
fac (Y, X) :-
    add (1, Z, X), fac (W, Z), mpy (W, X, Y). ... (24)
```

"nat (X)" of the expression (23) represents a program for defining an integer that is 0 or larger (where "s (X)" is a function for giving the next integer of "X"). "nat (X)" of the expression (23) is obtained from, for example, an input/output example string "{nat+ (s (s(0))), nat+ (s (0))}".

"fac (Y, X)" of the expression (24) represents a program in which a factorial of "X (X !)" is "Y" (where "add (X, Y, Z)" is a subprogram for adding "X" and "Y" and outputting the sum as "Z"). "mpy (W, X, Y)" is a subprogram for multiplying "W" by "X" and outputting the product as "Y". "fac (Y, X)" of the expression (24) is obtained from an input/output example such as "{fac+ (24, 4), fac+ (6, 3)}".

Next, the amount of calculation by the program generating apparatus 51 according to the second embodiment will be logically evaluated. The number of predicates necessary for obtaining a program for embodying the schema [4'] will be simply evaluated in the cases depending on whether or not the schema [4'] is present. When "|Xs|=n", the number of predicates of the body section of the schema [4'] is "n+4". In addition, assume that the number of predicates that are alternatives is "D".

First, the case that the schema [4'] is not given is considered. The commutative law of the logical product of Prolog is not satisfied. Thus, the order of predicates is meaningful. Consequently, the first predicate has D ways. Moreover, the next predicate has more than D ways corresponding to the selected results. At this point, the retrieving operation should be performed at least "$D^2$" times. Likewise, for the "i-th" predicate, the retrieving operation should be performed "$D^i$" times. In total, the retrieving operation should be performed $$\sum_{i=1}^{n+3} D^i$$

" (approximately, "$D^{(n+3)}$") times (where D is the density of the set of the pre-developed programs). When many pre-developed programs are used, the retrieving space is adversely wide.

Next, the retrieving operation in the case that the schema [4'] is given will be considered. All predicates depend on only "Y", "Xs", "PY", and "PXs" and individual values have been designated. Thus, the selection of a particular predicate does not affect the selection of another predicate. Consequently, since these predicates can be independently retrieved, the retrieving operation is performed at most "(n+3)×D" times.

For example, two auxiliary predicates "P (X, Y)" and "Q (Y, Z)" are arranged and the least number of times of the retrieving operation for embodying the parts of "P (X, Y)" and "Q (Y, Z)" at worst case is evaluated. In this case, assume that the first argument and the second argument of each of the auxiliary predicates "P" and "Q" represent an input and an output, respectively. In addition, assume that the values of "X" and "Z" have been designated. Moreover, assume that alternatives of "P" and "Q" are common. Furthermore, assume that three predicates of "p1", "p2", and "p3" are alternatives.

Figure 20:
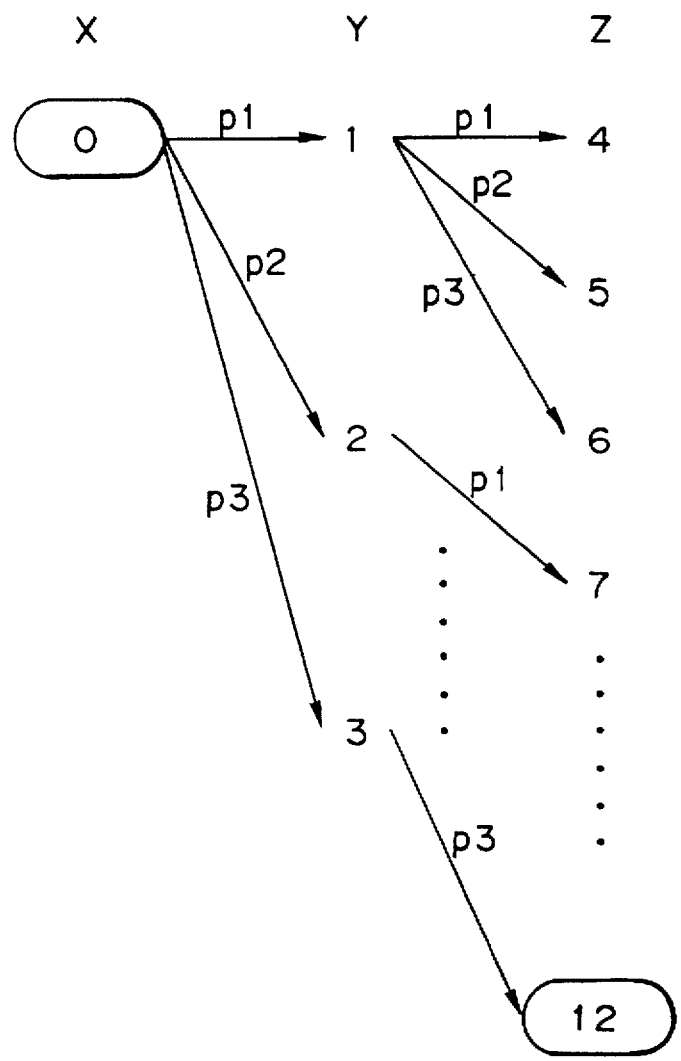
FIG. 20 is a schematic diagram showing a search space in the case that an intermediate variable, Y, has not been defined.

FIG. 20 is a schematic diagram showing a retrieving operation in the case that a variable "Y" has not been embodied. In this case, assume that "X =0" and "Z=12".

$$p1(X, Y) :- Y = 3*X + 1$$

$$p2(X, Y) :- Y = 3*X + 2$$

$$p3(X, Y) :- Y = 3*X + 3$$

First, "p1", "p2", and "p3" are successfully extracted as alternatives of "P". Giving "X=0" to these inputs, "Y=1, 2, and 3" are obtained respectively. Next, as alternatives of "Q", "p1", "p2", and "p3" are extracted. Giving "Y=1" to these inputs, "Z=4, 5, and 6" are obtained. Likewise, giving "Y=2 and 3" to alternatives "p1", "p2", and "p3" of "Q", there outputs are obtained. Giving "Y=3" to an alternative "p3" of "Q", "Z=12" is obtained. At this point, since the output accords with the value of "Z", as "P (X, Y)" and "Q (Y, Z)", "p3 (X, Y)" and "p3 (Y, Z)" are selected.

Thus, to obtain the value of "Y", the retrieving operation is performed three times. To obtain the value of "Z", the retrieving operation is performed nine times more. Thus, after the retrieving operation is performed a total of 12 times, the right value of "Z" is obtained.

Figure 21:
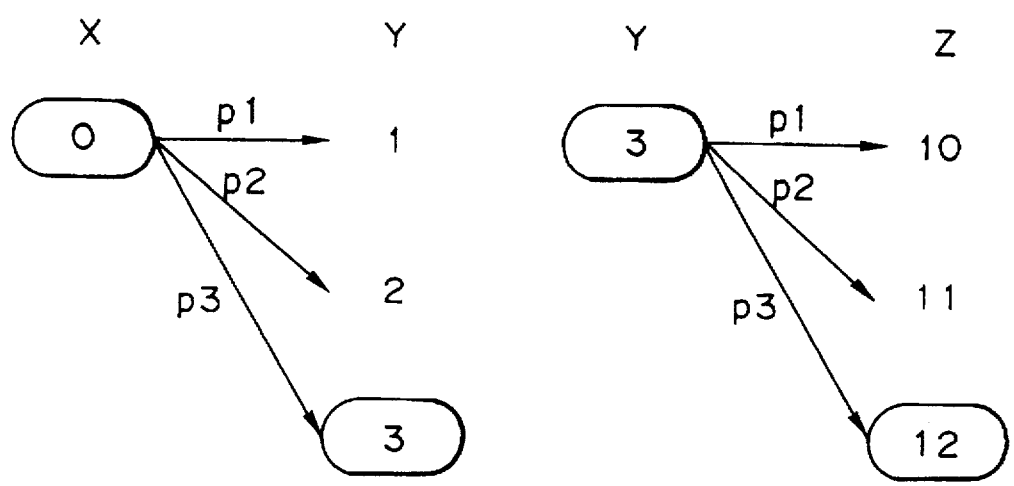
FIG. 21 is a schematic diagram showing a search space in the case that variables have been defined.

On the other hand, FIG. 21 shows the retrieving operation in the case that the variable "Y" has been embodied. "X", "Z", "p1", "p2", and "p3" shown in FIG. 21 are the same as those shown in FIG. 20. In addition, assume that "Y=3". First, "p1", "p2", and "p3" are successively extracted as alternatives of "P". Giving "X=0" to these inputs, "Y=1, 2, and 3" are obtained. In this case, "p3", of which the value of "Y" is output, is selected as "P". Next, "p1", "p2", and "p3" are extracted as alternatives of "Q". Giving "Y=3" to these inputs, "Z=10, 11, and 12" are obtained. "p3" of which the value of "Z" is output is selected as "Q".

In this case, to obtain the right values of "Y" and "Z", each retrieving operation is performed three times. Thus, the retrieving operation is performed at most six times.

According to the second embodiment, since inputs/outputs for all auxiliary predicates of the schema can be practically given, this operation is equivalent to the case shown in FIG. 21. Consequently, the number of times for the retrieving operation can be significantly reduced. As a result, the amount of calculation for the program generating process can be significantly reduced.

The program name retrieving unit 11, the program retrieving unit 21, and the program generating apparatus 31 (according to the first embodiment), the example string renaming unit 61, the stop part program synthesizing unit 71, and the program generating apparatuses 51 and 84 (according to the second embodiment) are accomplished as processing units that execute programs for corresponding functions. Thus, one processing unit may commonly function as another unit. Alternatively, each of these units may be provided as a dedicated unit.

Figure 22:
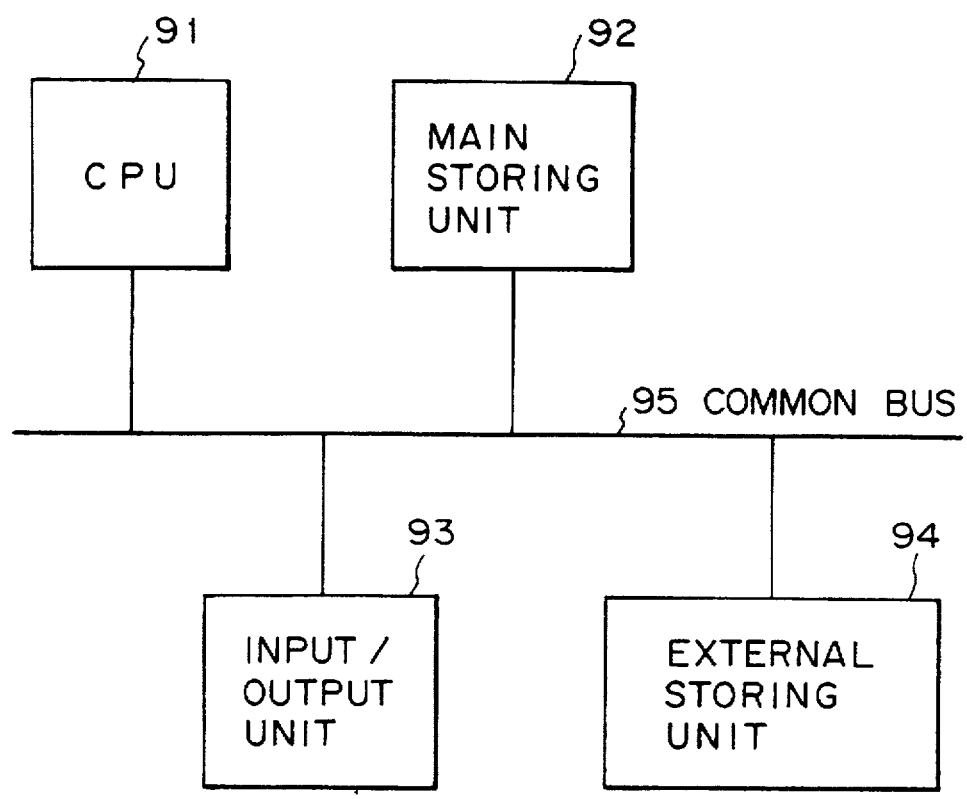
FIG. 22 is a block diagram showing an information processing apparatus according to an embodiment of the present invention.

FIG. 22 is a block diagram showing the construction of an information processing apparatus that accomplishes the first embodiment and the second embodiment as one unit. The information processing unit shown in FIG. 22 comprises a central processing unit (CPU) 91, a main storing unit 92, an input/output unit 93, an external storing unit 94, and a common bus 95 that connects these units. The CPU 91 causes the main storing unit 92 to store input/output examples that are received from the input/output unit 93. Thereafter, the CPU 91 performs a program generating process and outputs an obtained program name and so forth to the input/output unit 93. The input/output unit 93 includes a display unit with a keyboard, a printer, and so forth. The external storing unit 94 is, for example, a hard disk drive or the like that stores the reference program cache table 14, the reference program database 15, the conversion program database 37, and the schema database 55.

Along with the above-described functions "car" and "cdr", any functions such as "Y=X", "Z=[X|Y]", and "add (X, Y, Z)" can be selectively stored in the conversion program database 37. For example, the function "Y=X" can be used as a function for treating an input "X" as an output "Y". The function "Z=[X|Y]" can be used as a function for linking an input "X" with an input "Y" and outputting the result as a list "Z". The function "add (X, Y, Z)" can be used as a function for adding an input "X" and an input "Y" and outputting the sum as an output "Z", or a function for subtracting an input "Y" from an input "Z" and outputting the difference as an output "X".

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for use with an information processing apparatus for generating a desired program corresponding to pre-developed programs, comprising:

pre-processing means for receiving a given argument example as a key to select and supply information of an alternative program of the desired program; and determining means for applying a first part of said argument example to execute said alternative program based on information of said alternative program received from said pre-processing means, getting corresponding output, comparing said output with a second part of said argument example, determining whether or not said alternative program can be used, and outputting information of said alternative program when said alternative program can be used.

2. The apparatus as set forth in claim 1, wherein said argument example is a string composed of at least one real argument example, and includes at least one real example of input and output of said desired program.

3. The apparatus as set forth in claim 1, wherein said determining means determines that said alternative program can be used if said output accords with the second part of said argument example when said argument example is a correct input/output example of said desired program.

4. The apparatus as set forth in claim 1, wherein said determining means determines that said alternative program can be used if said output does not accord with the second part of said argument example when said argument example is an incorrect input/output example of said desired program.

5. The apparatus as set forth in claim 1, wherein the first part of said argument example accords with an input argument of said desired program, and wherein the second part of said argument example accords with an output argument of said desired program.

6. The apparatus as set forth in claim 1, wherein said determining means determines whether or not said alternative program can be used by setting the second part of said argument example to one of true and false and the output of said alternative program to one of true and false when said argument example is composed of only input argument examples of said desired program.

7. The apparatus as set forth in claim 1, further comprising:

program information storing means for storing information of a plurality of programs, wherein said pre-processing means is adapted for retrieving and outputting information of said alternative program from said program information storing means.

8. The apparatus as set forth in claim 7, wherein said pre-processing means is adapted for selecting said alternative program corresponding to said given argument example and retrieving information of said alternative program from said program information storing means.

9. The apparatus as set forth in claim 7, wherein information of said alternative program includes at least one of a program name of said alternative program and said alternative program.

10. The apparatus as set forth in claim 9, wherein said program name is one of a procedure name, a function name, a predicate name, and a calling name.

11. The apparatus as set forth in claim 7, wherein said program information storing means includes:

reference program database means for storing plural programs; and reference program cache table means for storing partial information of at least one of the plurality of programs.

12. The apparatus as set forth in claim 11, wherein partial information includes at least one of a program name of at least one program and information of an argument.

13. The apparatus as set forth in claim 1, further comprising:

argument exchanging means for supplying said first argument example based on a result of substituting properly argument positions included in said given argument example to said pre-processing means.

14. The apparatus as set forth in claim 13, wherein said argument exchanging means is adapted for outputting relationship between said given argument example and said first argument example.

15. The apparatus as set forth in claim 1, further comprising:

argument number increasing/decreasing means for supplying a second argument example based on a result of changing a number of arguments included in said given argument example to said pre-processing means.

16. The apparatus as set forth in claim 15, wherein said argument number increasing/decreasing means is adapted for outputting relationship between said given argument example and said second argument example.

17. The apparatus as set forth in claim 1, further comprising:

adaptive converting means for supplying a third argument example based on a result of changing the value of each argument included in said given argument example to said pre-processing means.

18. The apparatus as set forth in claim 17, wherein said adaptive converting means is adapted for outputting relationship between said given argument example and said third argument example.

19. The apparatus as set forth in claim 17, further comprising:

conversion program database means for storing a conversion program applied to each argument included in said given argument example, wherein said adaptive converting means is adapted for changing the value of each argument included in said given argument example by using said conversion program retrieved from said conversion program database means.

20. An apparatus for use with an information processing apparatus for generating a desired program corresponding to pre-developed programs, comprising:

pre-processing means for receiving an argument example of a subprogram and outputting information of an alternative programs of said subprogram;

determining means for applying a first part of the argument example of the subprogram to the alternative program based on information of said alternative program received from said pre-processing means, obtaining an output of the alternative program, comparing said output with a second part of the argument example of said subprogram, determining whether or not said alternative program can be used, and outputting information of said alternative program when said alternative program can be used; and synthesizing means for generating an argument example of said subprogram from a given argument example by using a schema that represents the structure of a program, supplying the argument example of said subprogram to said pre-processing means, receiving information of said alternative program from said determining means, and synthesizing a program representing a schema by using information of said alternative program.

21. The program generating apparatus as set forth in claim 20, further comprising:

schema database means for storing said schema, wherein said synthesizing means is adapted for retrieving said schema from said schema database means and using a retrieved schema.

22. The apparatus as set forth in claim 20, further comprising:

example string analyzing means for modifying a first argument example string composed of two or more argument examples to a second argument example string and supplying argument examples of said second argument example string to said synthesizing means.

23. The apparatus as set forth in claim 22, wherein said example string analyzing means includes:

variable generating means for selectively changing an argument included in each argument example of said first argument example string to a variable; and differential function extracting means for extracting a differential function that represents relationship between a first argument example that has been changed to a variable and a second argument example and unifying the arguments of said first argument example and said second argument example.

24. The program generating apparatus as set forth in claim 20, further comprising:

program finding means for supplying an argument example of said subprogram to said synthesizing means when information of said alternative program cannot be obtained, wherein said synthesizing means is adapted for properly selecting a schema that represents said subprogram and synthesizing said subprogram corresponding to an argument example of said subprogram.

25. The program generating apparatus as set forth in claim 20, wherein said synthesizing means is adapted for using a recursive schema that represents the structure of a recursive program as said schema.

26. The program generating apparatus as set forth in claim 25, further comprising:

stop part program synthesizing means for receiving a recursive part program from said synthesizing means and said given argument example, estimating a stop argument example upon completion of said recursive part program, and synthesizing a program corresponding to a stop part.

27. An apparatus for use with an information processing apparatus for generating a desired program corresponding to pre-developed programs, comprising:

reference program cache table means for storing partial information of at least one program of a plurality of programs to be retrieved; and means for retrieving partial information from said reference program cache table means by using given information and outputting information of an alternative program of a desired program.

28. An apparatus for use with an information processing apparatus for generating a desired program corresponding to pre-developed programs, comprising:

means for generating a new argument example from a given argument example, and outputting a relationship between said given argument example and said new argument example;

means for obtaining an alternative program of a desired program corresponding to a new argument example and outputting information of said alternative program; and means for modifying said alternative program using said relationship.

29. A method for use with an information processing apparatus for generating a desired program corresponding to pre-developed programs, comprising the steps of:

(a) receiving a given argument example as a key;

(b) selecting an alternative program of a desired program based on said key;

(c) applying a first part of said argument example to execute said alternative program based on information of said alternative program and obtaining an output of said alternative program;

(d) comparing said output with a second part of said argument example and determining whether or not said alternative program can be used; and (e) outputting information of said alternative program when said alternative program can be used.

30. A method for use with an information processing apparatus for generating a desired program corresponding to pre-developed programs, comprising:

pre-processing step of receiving a given argument example as a key to select and supply information of an alternative program of the desired program; and determining step of applying a first part of said argument example to execute said alternative program based on information of said alternative program received from said pre-processing step, getting corresponding output, comparing said output with a second part of said argument example, determining whether or not said alternative program can be used, and outputting information of said alternative program when said alternative program can be used.

31. A method for use with an information processing apparatus for generating a desired program corresponding to pre-developed programs, comprising:

pre-processing step of receiving an argument example of a subprogram and outputting information of an alternative programs of said subprogram;

determining step of applying a first part of the argument example of the subprogram to the alternative program based on information of said alternative program received from said pre-processing step, obtaining an output of the alternative program, comparing said output with a second part of the argument example of said subprogram, determining whether or not said alternative program can be used, and outputting information of said alternative program when said alternative program can be used; and synthesizing step of generating an argument example of said subprogram from a given argument example by using a schema that represents the structure of a program, supplying the argument example of said subprogram to said pre-processing step, receiving information of said alternative program from said determining step, and synthesizing a program representing a schema by using information of said alternative program.

32. A computer-readable recording medium used to direct a computer to function in a particular manner when used by the computer for use with an information processing apparatus for generating a desired program corresponding to pre-developed programs, comprising:

pre-processing procedures for receiving a given argument example and supplying information of an alternative program of the desired program;

determining procedures for applying a first part of an argument example to said alternative program based on information of said alternative program received from said pre-processing procedures, getting corresponding output, comparing said output with a second part of said argument example, determining whether or not said alternative program can be used, and outputting information of said alternative program when said alternative program can be used;

program information storing procedures for storing information of a plurality of programs;

reference program database procedures for storing plural programs;

reference program cache table procedures for storing partial information of at least one of the plurality of programs;

argument exchanging procedures for supplying said first argument example based on a result of substituting properly argument positions included in said given argument example to said pre-processing procedures;

argument number increasing/decreasing procedures for supplying a second argument example based on a result of changing a number of arguments included in said given argument example to said pre-processing;

adaptive converting procedures for supplying a third argument example based on a result of changing the value of each argument included in said given argument example to said pre-processing; and conversion program database procedures for storing a conversion program applied to each argument included in said given argument example.

33. A computer-readable recording medium used to direct a computer to function in a particular manner when used by the computer for use with an information processing apparatus for generating a desired program corresponding to pre-developed programs, comprising:

pre-processing procedures for receiving an argument example of a subprogram and outputting information of an alternative programs of said subprogram;

determining procedures for applying a first part of the argument example of the subprogram to the alternative program based on information of said alternative program received from said pre-processing procedures, obtaining an output of the alternative program, comparing said output with a second part of the argument example of said subprogram, determining whether or not said alternative program can be used, and outputting information of said alternative program when said alternative program can be used; and synthesizing procedures for generating an argument example of said subprogram from a given argument example by using a schema that represents the structure of a program, supplying the argument example of said subprogram to said pre-processing procedures, receiving information of said alternative program from said determining procedures, and synthesizing a program representing a schema by using information of said alternative program;

schema database procedures for storing said schema;

example string analyzing procedures for modifying a first argument example string composed of two or more argument examples to a second argument example string and supplying argument examples of said second argument example string to said synthesizing;

variable generating procedures for selectively changing an argument included in each argument example of said first argument example string to a variable; and differential function extracting procedures for extracting a differential function that represents relationship between a first argument example that has been changed to a variable and a second argument example and unifying the arguments of said first argument example and said second argument example;

program finding procedures for supplying an argument example of said subprogram to said synthesizing when information of said alternative program cannot be obtained; and stop part program synthesizing procedures for receiving a recursive part program from said synthesizing and said given argument example, estimating a stop argument example upon completion of said recursive part program, and synthesizing a program corresponding to a stop part.

34. A computer-readable recording medium used to direct a computer to function in a particular manner when used by the computer for use with an information processing apparatus for generating a desired program corresponding to pre-developed programs, comprising:

reference program cache table procedures for storing partial information of at least one program of a plurality of programs to be retrieved; and procedures for retrieving partial information from said reference program cache table procedures by using given information and outputting information of an alternative program of a desired program.

35. A computer-readable recording medium used to direct a computer to function in a particular manner when used by the computer for use with an information processing apparatus for generating a desired program corresponding to pre-developed programs, comprising:

procedures for generating a new argument example from a given argument example;

procedures for obtaining an alternative program of a desired program corresponding to a new argument example and outputting information of an alternative program; and procedures for modifying said alternative program using a relationship between said given argument example and said new argument example.

36. A computer-readable recording medium used to direct a computer to function in a particular manner when used by the computer for use with an information processing apparatus for generating a desired program corresponding to pre-developed programs, comprising the step procedures of:

(a) receiving a given argument example as a key;

(b) selecting an alternative program of a desired program based on said key;

(c) applying a first part of said argument example to execute said alternative program based on information of said alternative program and obtaining an output of said alternative program;

(d) comparing said output with a second part of said argument example and determining whether or not said alternative program can be used; and (e) outputting information of said alternative program when said alternative program can be used.

* * * * *